US009144044B2

(12) United States Patent
Baldemair et al.

(10) Patent No.: US 9,144,044 B2
(45) Date of Patent: Sep. 22, 2015

(54) METHODS PROVIDING AIDED SIGNAL SYNCHRONIZATION AND RELATED NETWORK NODES AND DEVICES

(75) Inventors: Robert Baldemair, Solna (SE); Magnus Larsson, Sollentuna (SE); Stefan Parkvall, Stockholm (SE)

(73) Assignee: OPTIS CELLULAR TECHNOLOGY, LLC, Plano, TX (US)

( * ) Notice: Subject to any disclaimer, the term of this patent is extended or adjusted under 35 U.S.C. 154(b) by 397 days.

(21) Appl. No.: 13/043,027

(22) Filed: Mar. 8, 2011

(65) Prior Publication Data

US 2012/0082152 A1  Apr. 5, 2012

Related U.S. Application Data

(60) Provisional application No. 61/388,836, filed on Oct. 1, 2010.

(51) Int. Cl.
*H04W 56/00* (2009.01)

(52) U.S. Cl.
CPC ........ *H04W 56/001* (2013.01); *H04W 56/0015* (2013.01)

(58) Field of Classification Search
CPC .................. H04W 56/0015; H04W 56/001
USPC ................... 370/350–356, 329, 328
See application file for complete search history.

(56) References Cited

U.S. PATENT DOCUMENTS

2006/0274712 A1*  12/2006  Malladi et al. ................. 370/345
2008/0031186 A1*   2/2008  Onggosanusi et al. ....... 370/328
2008/0287068 A1*  11/2008  Etemad ........................... 455/68
2009/0316659 A1*  12/2009  Lindoff et al. ................ 370/332
2010/0061284 A1*   3/2010  Chen et al. .................... 370/311
2010/0278130 A1*  11/2010  Sambhwani et al. ......... 370/329
2010/0284367 A1*  11/2010  Koo et al. ..................... 370/331
2011/0002281 A1*   1/2011  Terry et al. .................... 370/329
2011/0013548 A1*   1/2011  Chen et al. .................... 370/311
2011/0026422 A1*   2/2011  Ma et al. ....................... 370/252
2011/0053658 A1*   3/2011  Park et al. ..................... 455/574

(Continued)

FOREIGN PATENT DOCUMENTS

WO    WO 2010/008228 A2     1/2010
WO    WO 2010008228 A2 *    1/2010   ............ H04W 52/02

OTHER PUBLICATIONS

Institute for Information Industry (III) et al.: "DL Frame Timing in Carrier Aggregation", 3GPP Draft; R1-104869, vol. RAN WG1, No. Madrid, Spain; Aug. 17, 2010, XP050450029.

(Continued)

*Primary Examiner* — Khaled Kassim
(74) *Attorney, Agent, or Firm* — Vincent J. Allen; Austin C. Teng; Carstens & Cahoon, LLP

(57) ABSTRACT

Methods may be providing for signal synchronization at a wireless terminal communicating with a radio access network. For example, a command may be received from the radio access network, and the command may be to add a first carrier on a first frequency as a link for communications from the radio access network to the wireless terminal. Responsive to receiving the command to add the first carrier, the first carrier may be synchronized and/or configured using signals of a second carrier on a second frequency different than the first frequency. Related wireless terminals, network nodes, and network node methods are also discussed.

21 Claims, 17 Drawing Sheets

(56) References Cited

U.S. PATENT DOCUMENTS

| | | | |
|---|---|---|---|
| 2011/0070880 A1* | 3/2011 | Song et al. .................... | 455/423 |
| 2011/0103333 A1* | 5/2011 | Berggren et al. ............. | 370/329 |
| 2011/0116467 A1* | 5/2011 | Jung et al. .................... | 370/329 |
| 2011/0170420 A1* | 7/2011 | Xi et al. ........................ | 370/241 |
| 2011/0261704 A1* | 10/2011 | Etemad ......................... | 370/252 |
| 2011/0274007 A1* | 11/2011 | Lin et al. ....................... | 370/254 |
| 2011/0280287 A1* | 11/2011 | Cheng et al. .................. | 375/219 |
| 2011/0281615 A1* | 11/2011 | Yamada et al. ............... | 455/524 |
| 2011/0300856 A1* | 12/2011 | Aminaka .................... | 455/422.1 |
| 2011/0310877 A1* | 12/2011 | Wu et al. ....................... | 370/343 |
| 2012/0057490 A1* | 3/2012 | Park et al. ..................... | 370/252 |
| 2012/0057544 A1* | 3/2012 | Xu et al. ........................ | 370/329 |
| 2012/0106530 A1* | 5/2012 | Drugge et al. ................ | 370/338 |
| 2012/0170526 A1* | 7/2012 | Wei ................................ | 370/329 |
| 2012/0230265 A1* | 9/2012 | Lee et al. ...................... | 370/329 |

OTHER PUBLICATIONS

International Search Report Corresponding to International Application No. PCT/SE2011/050255; Date of Mailing: Jun. 28, 2011; 3 pages.

Nokia Siemens Networks (Rapporteur): Corrections and new Agreements on Carrier Aggregation: 3GPP Draft; 36300_CR0248R4_(REL-10)_R2-105268 vol. RAN WG2, No. Madrid, Spain; Sep. 8, 2010, XP050452278.

Nokia Siemens Networks et al.: "MAC CE for Activation Deactivation", 3GPP Draft; R2-104316 MAC CE for Activation Deactivation, vol. RAN WG2, No. Madrid, Spain; Aug. 17, 2010, XP050451822.

Panasonic: "component carrier types in LTE-A", 3GPP Draft; R2-095312_COMPONENT_CARRIER_TYPES No. Shenzhen, China; Aug. 24, 2009, XP050389780.

RAN4: "Reply to LS on DL timing difference and DL timing reference in Carrier Aggregation", 3GPP Draft: R2-104230_R4-102713 vol. RAN WG2, No. Madrid, Spain; Aug. 11, 2010, XP050451462.

Written Opinion of the International Searching Authority Corresponding to International Application No. PCT/SE2011/050255; Date of Mailing: Jun. 28, 2011; 8 pages.

3GPP TSG-RAN WG2 Meeting #70, Montreal, Canada, May 10-14, 2010, R2-103427, Titled: Stage 2 description of Carrier Aggregation, Nokia Siemens Networks.

International Preliminary Report on Patentability Corresponding to International Application No. PCT/US2011/050255; Date of Issuance: Apr. 2, 201; 7 Pages.

U.S. Appl. No. 61/081,713, filed Jul. 17, 2008, in Uk Jung and Ki Seon Ryu, Resource Allocation and Sleep Mode Support for Multi Carrier.

U.S. Appl. No. 61/090,239, filed Aug. 20, 2008, Young Soo Yuk and in Uk Jung, "Power Saving Scheme for Multi-Carrier".

3GPP TSG RAN WG1 Meeting #62bis, Xian, China, Oct. 11-15, 2010, R1-105321, Titled: Remaining Details for CA-based HetNets, Ericsson, ST-Ericsson.

3GPP TSG RAN WG1 Meeting #63bis, Dublin, Ireland, Jan. 17-21, 2011, R1-110031, Titled: Remaining Details for CA-based HetNets, Ericsson, ST-Ericsson.

* cited by examiner

Rx power (solid, dotted_ > macro), 1/pathloss (dashed)

Inter-cell Interference (dotted)

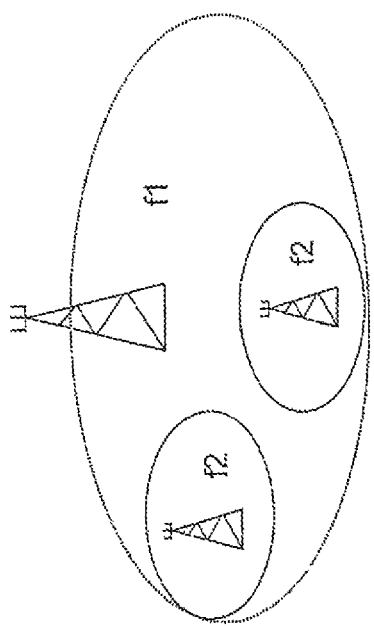
*Figure 6*
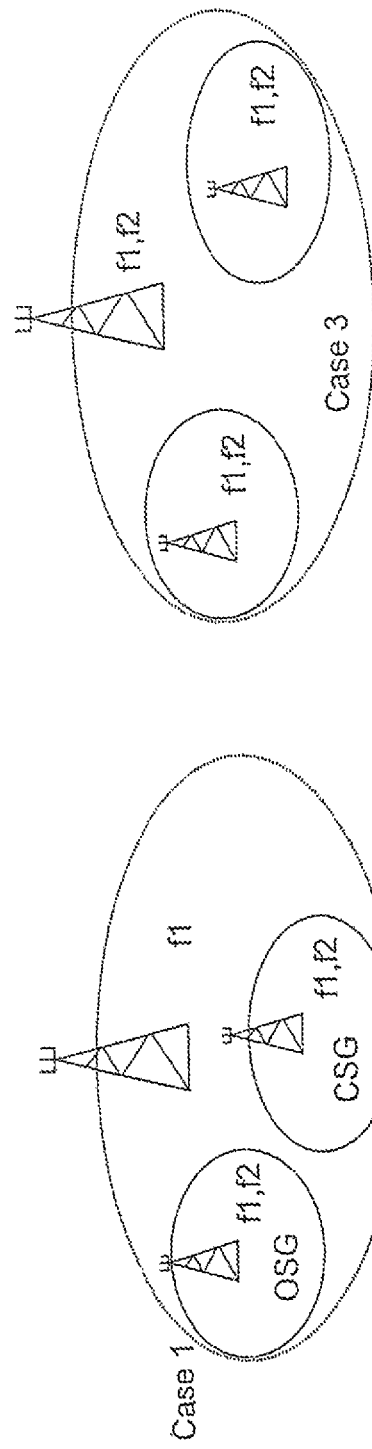
*Figure 7A*
*Figure 7B*

METHODS PROVIDING AIDED SIGNAL SYNCHRONIZATION AND RELATED NETWORK NODES AND DEVICES

RELATED APPLICATION

The present application claim the benefit of priority of U.S. Application No. 61/388,836 filed Oct. 1, 2010, the disclosure of which is hereby incorporated herein in its entirety by reference.

BACKGROUND

The present invention relates to communications, and more particularly, to radio communications networks and terminals.

In a typical cellular radio system, wireless terminals (also known as mobile stations and/or user equipment units (UEs)) communicate via a radio access network (RAN) to one or more core networks. User equipment units may include mobile telephones ("cellular" telephones) and/or other processing devices with wireless communication capability, such as, for example, portable, pocket, hand-held, laptop computers, which communicate voice and/or data with the RAN.

The RAN covers a geographical area which is divided into cell areas, with each cell area being served by a base station, e.g., a radio base station (RBS), which in some networks is also called a "NodeB" or enhanced NodeB "eNodeB", which can be abbreviated "eNB." A cell area is a geographical area where radio coverage is provided by the radio base station equipment at a base station site. The base stations communicate over the air interface operating on radio frequencies with UEs within range of the base stations.

In some versions of the radio access network, several base stations are typically connected (e.g., by landlines or microwave) to a radio network controller (RNC). The radio network controller, also sometimes termed a base station controller (BSC), supervises and coordinates various activities of the plural base stations connected thereto. The radio network controllers are typically connected to one or more core networks.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) access technology. UTRAN, short for UMTS Terrestrial Radio Access Network, is a collective term for the Node B's and Radio Network Controllers which make up the UMTS radio access network. Thus, UTRAN is essentially a radio access network using wideband code division multiple access for user equipment units.

The Third Generation Partnership Project (3GPP) has undertaken to evolve further the UTRAN and GSM based radio access network technologies. In this regard, specifications for the Evolved Universal Terrestrial Radio Access Network (E-UTRAN) are ongoing within 3GPP. The Evolved Universal Terrestrial Radio Access Network (E-UTRAN) comprises the Long Term Evolution (LTE) and System Architecture Evolution (SAE).

FIG. 1 is a simplified block diagram of a Long Term Evolution (LTE) RAN 100. The LTE RAN 100 is a variant of a 3GPP RAN where radio base station nodes (eNodeBs) are connected directly to a core network 130 rather than to radio network controller (RNC) nodes. In general, in LTE the functions of a radio network controller (RNC) node are performed by the radio base stations nodes. Each of the radio base station nodes (eNodeBs) 122-1, 122-2, ... 122-M communicate with UEs (e.g., UE 110-1, 110-2, 110-3, ... 110-L) that are within their respective communication service cells. The radio base station nodes (eNodeBs) can communicate with one another through an X2 interface and with the core network 130 through S1 interfaces, as is well known to one who is skilled in the art.

The LTE standard is based on multi-carrier based radio access schemes such as Orthogonal Frequency-Division Multiplexing (OFDM) in the downlink and Discrete Fourier Transform (DFT)-spread OFDM in the uplink. The OFDM technique distributes the data over a large number of carriers that are spaced apart at precise frequencies. This spacing provides the "orthogonality" in this technique which avoids having demodulators see frequencies other than their own. The benefits of OFDM are high spectral efficiency, resiliency to RF interference, and lower multi-path distortion.

FIG. 2 illustrates a resource grid for frequency and time resource elements (REs), where each resource element corresponds to one OFDM subcarrier during one OFDM symbol interval. In the time domain, LTE downlink transmissions may be organized into radio frames of 10 ms, and each radio frame may consist of ten equally-sized subframes of length $T_{subframe}=1$ ms, as illustrated in FIG. 3.

One or more resource schedulers in the LTE RAN 100 allocate resources for uplink and downlink in terms of resource blocks, where a resource block corresponds to one slot (0.5 ms) in the time domain and 12 subcarriers in the frequency domain. Resource blocks are numbered in the frequency domain, starting with 0 from one end of the system bandwidth.

The LTE Rel-8 standard has recently been standardized, supporting bandwidths up to 20 MHz. 3GPP has initiated work on LTE Rel-10 in order to support bandwidths larger than 20 MHz and support other requirements defined by IMT-Advanced Requirements. Another requirement for LTE Rel-10 is to provide backward compatibility with LTE Rel-8, including spectrum compatibility. This requirement may cause an LTE Rel-10 carrier to appear as a number of LTE carriers to an LTE Rel-8 terminal. Each such carrier can be referred to as a Component Carrier (CC). In particular for early LTE Rel-10 deployments it can be expected that there will be a smaller number of LTE Rel-10-capable terminals compared to many LTE legacy terminals. Therefore, it can be particularly important to ensure efficient use of the wide carrier by legacy terminals, such as by enabling legacy terminals to be scheduled in all parts of the wideband LTE Rel-10 carrier. One way to obtain this may be by means of Carrier Aggregation. Carrier Aggregation refers to an LTE Rel-10 terminal being configured to receive multiple CC, where the CC have, or at least the possibility to have, the same structure as a Rel-8 carrier. The same structure as Rel-8 implies that all Rel-8 signals, e.g. (primary and secondary) synchronization signals, reference signals, system information are transmitted on each carrier. FIG. 4 graphically illustrates an exemplary 100 MHz Carrier Aggregation of five 20 MHz CCs.

Referring to FIG. 4, the number of aggregated CC as well as the bandwidth of the individual CC may be different for uplink and downlink. A symmetric configuration refers to the case where the number of CCs in downlink and uplink is the same whereas an asymmetric configuration refers to the case that the numbers of CCs in downlink and uplink are different. It is important to note that the number of CCs offered by the network may be different from the number of CCs seen by a terminal. For example, a terminal may support more downlink CCs than uplink CCs, even though the network offers the same number of uplink and downlink CCs.

During initial access a LTE Rel-10 terminal may operate similarly to a LTE Rel-8 terminal. Upon successful connection to the network, a terminal may—depending on its own capabilities and the network—be configured with additional CCs in the UL and DL. Configuration is based on Radio Resource Control (RRC). Due to the heavy signaling and rather slow speed of RRC signaling, a terminal may be configured with multiple CCs even though not all of them are currently used. If a terminal is configured for multiple CCs it may have to monitor Physical Downlink Control Channel (PDCCH) and Physical Downlink Shared Channel (PDSCH) for all DL CCs. However, such terminal configuration may necessitate use of a wider receiver bandwidth, higher sampling rates, etc. resulting in high power consumption.

With multiple CCs used to provide downlinks from a RAN to a wireless terminal over respective different frequencies, the wireless terminal may be required to synchronize and/or configure each of the multiple CCs received over each of the different frequencies.

SUMMARY

According to some embodiments, a method may provide signal synchronization at a wireless terminal communicating with a radio access network. More particularly, a command may be received from the radio access network, and the command may be to add a first carrier on a first frequency as a link for communications from the radio access network to the wireless terminal. Responsive to receiving the command to add the first carrier, the first carrier may be synchronized and/or configured using signals of a second carrier on a second frequency different than the first frequency. The first and second carriers, for example, may be transmitted from a same antenna location and/or node of the radio access network. Moreover, the first carrier may be synchronized and/or configured using synchronization signals of the second carrier that are aligned (e.g., time aligned) with the first carrier.

By allowing a wireless terminal to synchronize and/or configure a new carrier (e.g., a secondary downlink component carrier) using synchronization signals of another carrier (e.g., a primary downlink component carrier), the new carrier is not required to include/provide synchronization signals as long as the other carrier (e.g., the primary component carrier) includes synchronization signals that are time aligned with the new component carrier. Accordingly, the wireless terminal may synchronize and/or configure the new carrier even if the new carrier is transmitted without synchronization signals, even if synchronization signals of the new carrier are subject to interference, even if synchronization signals of the new carrier are provided with insufficient power, etc. In addition, a node of the radio access network may transmit some carriers without synchronization signals provided that at least one carrier (e.g., a primary component carrier) includes synchronization signals that are time aligned with the carriers transmitted without synchronization signals.

The second carrier on the second frequency may be a primary component carrier, and the primary component carrier may be received before receiving the command to add the first carrier. The command to add the first carrier may include receiving the command to add the first carrier over the second carrier. Before synchronizing and/or configuring the first carrier using signals of the second carrier, information may be received from the radio access network relating the second carrier as a source of signals that can be used to synchronize and/or configure the first carrier.

Responsive to receiving the command to add the first carrier, the wireless terminal may determine if the first carrier can be synchronized and/or configured using signals of the first carrier. Responsive to determining that the first carrier can be synchronized and/or configured using signals of the first carrier, the first carrier may be synchronized and/or configured using signals of the first carrier. In contrast, the first carrier may be synchronized and/or configured using the signals of the second carrier on the second frequency different than the first frequency responsive to determining that the first carrier cannot be synchronized and/or configured using signals of the first carrier.

The command may include a parameter, and the first carrier may be synchronized and/or configured using signals of the first carrier responsive to receiving the command having a first status of the parameter. In contrast, the first carrier may be synchronized and/or configured using the signals of the second carrier on the second frequency responsive to receiving the command having a second status of the parameter.

In some embodiments, the parameter may include a flag, the first status of the parameter may be a first value of the flag, and the second status of the parameter may be a second value of the flag different than the first value. In some other embodiments, the first status of the parameter may be an absence of the parameter in the command, and the second status of the parameter may be a presence of the parameter in the command. The parameter may comprise an indication of a cyclic prefix length of the first carrier and/or a transmission bandwidth of the first carrier.

According to some other embodiments, a wireless terminal may include a processor configured to receive a command from a radio access network. The command may be to add a first carrier on a first frequency as a link for communications from the radio access network to the wireless terminal. The processor may be further configured to synchronize and/or configure the first carrier using signals of a second carrier on a second frequency different than the first frequency responsive to receiving the command to add the first carrier.

According to still other embodiments, a method may be provided for a radio access network node to add a carrier for transmission to a wireless terminal communicating with the radio access network node. The radio access network node may transmit, to the wireless terminal, a first carrier on a first frequency, with the first carrier including signals aligned with a second carrier on a second frequency different than the first frequency. The radio access network node may transmit information to the wireless terminal relating the first carrier as a source of the signals aligned with the second carrier that can be used at the wireless terminal to synchronize and/or configure the second carrier. The radio access network node may transmit, to the wireless terminal, a command to add the second carrier for communications from the radio access network node to the wireless terminal. After transmitting the command to add the second carrier for communications, the radio access network node may transmit communications to the wireless terminal over the second carrier.

Transmitting the command to add the second carrier may include transmitting the command to add the second carrier over the first carrier, and/or the first carrier may be a primary carrier. Moreover, the second carrier may be transmitted without synchronization signals.

The command may be a first command to add the second carrier. Transmitting the first command may include transmitting the first command including a parameter having a first status of the parameter to identify the first carrier as including the signals aligned with the second carrier to be used by the wireless terminal to synchronize and/or configure the second carrier. In addition, the radio access network node may transmit, to the wireless terminal, a second command to add a third carrier on a third frequency for communications from the radio access network node to the wireless terminal, and the second command may include the parameter having a second status to identify the third carrier as including signals to be used by the wireless terminal to synchronize and/or configure the third carrier, wherein the second and third frequencies are different. After transmitting the second command to add the third carrier for communications to the wireless terminal, the radio access network node may transmit communications to the wireless terminal over the third carrier.

The parameter may include a flag, with the first status of the parameter being a first value of the flag, and with the second status of the parameter being a second value of the flag different than the first value. In an alternative, the first status of the parameter may be a presence of the parameter in the first command, and the second status of the parameter may be an absence of the parameter in the second command. For example, the parameter may be an indication of a cyclic prefix length of the second carrier and/or a transmission bandwidth of the second carrier. Moreover, transmitting the first carrier, transmitting the information relating the first carrier as a source, transmitting the command, and transmitting the communications may be performed at a same antenna location of the radio access network node.

According to yet other embodiments, a radio access network node providing communications with a wireless terminal may include radio frequency circuitry. More particularly, the radio frequency circuitry may be configured to transmit, to the wireless terminal, a first carrier on a first frequency, with the first carrier including signals aligned with a second carrier on a second frequency different than the first frequency. The radio frequency circuitry may be configured to transmit information to the wireless terminal relating the first carrier as a source of the signals aligned with the second carrier that can be used at the wireless terminal to synchronize and/or configure the second carrier. The radio frequency circuitry may be configured to transmit, to the wireless terminal, a command to add the second carrier for communications from the radio access network node to the wireless terminal. In addition, the radio frequency circuitry may be configured to transmit communications to the wireless terminal over the second carrier after transmitting the command to add the second carrier for communications. For example, the radio frequency circuitry may be configured to transmit the command to add the second carrier over the first carrier.

BRIEF DESCRIPTION OF THE DRAWINGS

The accompanying drawings, which are included to provide a further understanding of the invention and are incorporated in and constitute a part of this application, illustrate certain embodiment(s) of the invention. In the drawings:

FIG. 6 illustrates one frequency reuse pattern that may be employed in the exemplary heterogeneous network of FIG. 5;

FIGS. 7A and 7B illustrate some other frequency reuse patterns that may be employed in the exemplary heterogeneous network of FIG. 5;

DETAILED DESCRIPTION

The invention will now be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
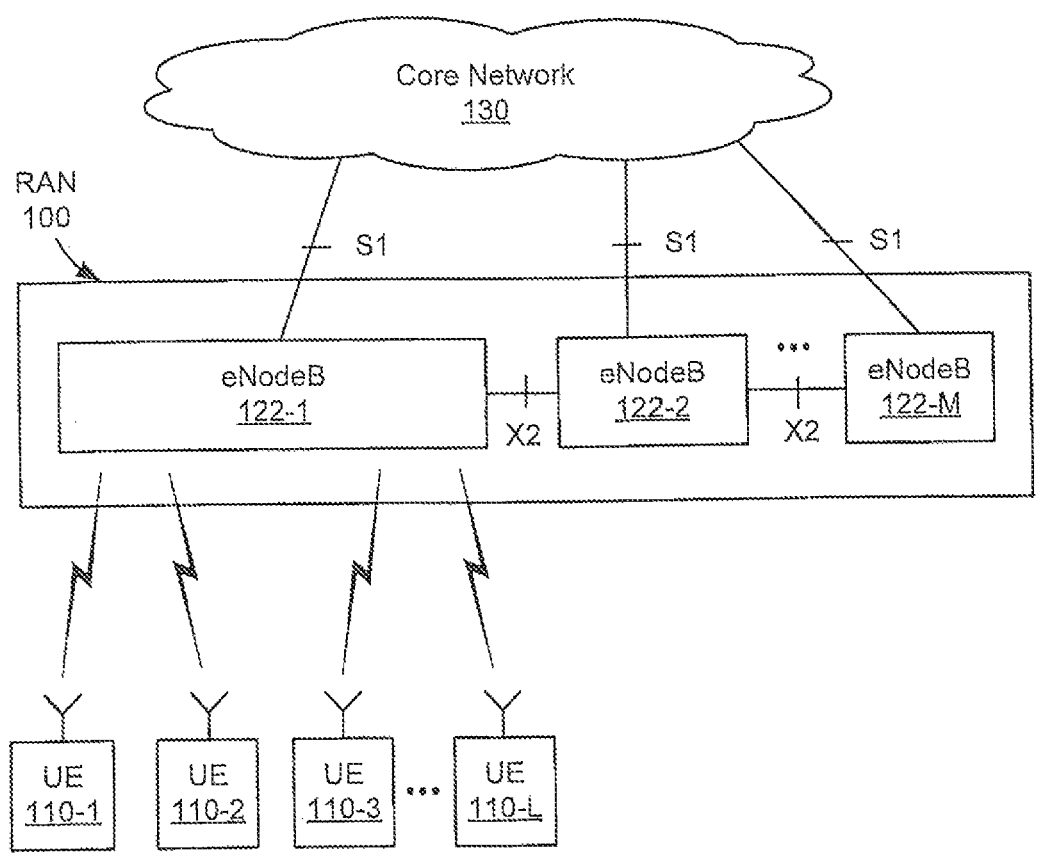
FIG. 1 is a block diagram of a LTE RAN.
Figure 2:
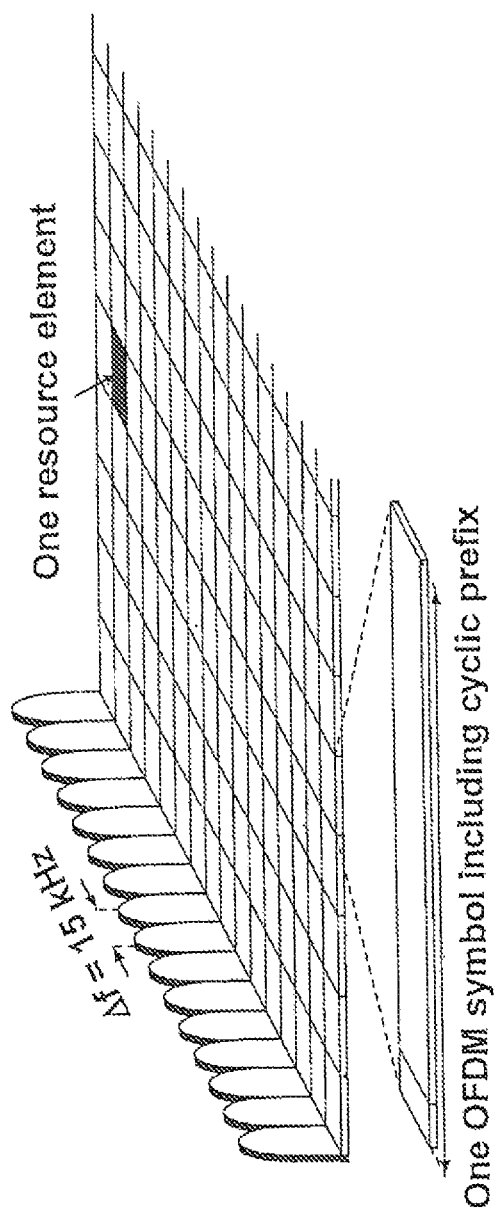
FIG. 2 illustrates a conventional resource grid of frequency and time resource elements that can be scheduled for communication use between a network node and UEs.
Figure 3:
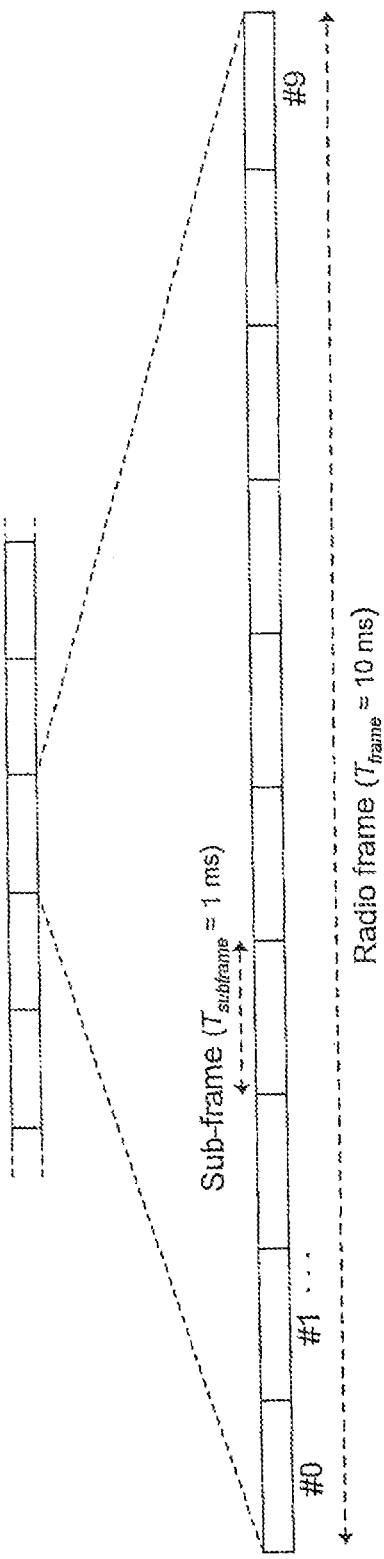
FIG. 3 illustrates an exemplary LTE downlink radio frame that is divided into subframes.
Figure 4:
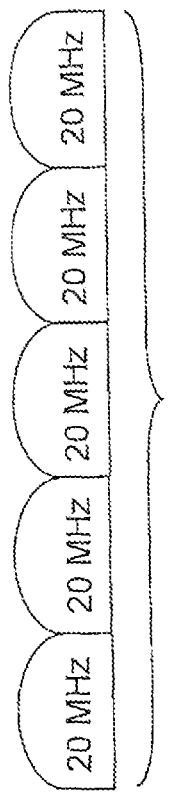
FIG. 4 illustrates an exemplary Carrier Aggregation of Component Carriers.

For purposes of illustration and explanation only, various embodiments of the present invention are described herein in the context of operating in a LTE RAN, such as the RAN 100 of FIG. 1. It will be understood, however, that the present invention is not limited to such embodiments and may be embodied generally in any type of RAN that is configured to transmit and/or receive according to one or more RATs.

To mitigate one or more of the above-described problems, LTE Rel-10 supports activation of CCs in addition to configuration of CCs. The terminal monitors only PDCCH and PDSCH for configured and activated CCs. Since activation is based on Medium Access Control (MAC) control elements—which are faster than RRC signaling—activation/de-activation can follow the number of CCs that is required to fulfill the current data rate needs. Upon arrival of large data amounts multiple CCs are activated, used for data transmission, and de-activated if not needed anymore. All but one CC—the DL Primary CC (DL PCC)—can be de-activated. Activation provides therefore the possibility to configure multiple CC but only activate them on an as-needed basis. Most of the time a terminal would have one or very few CCs activated resulting in a lower reception bandwidth and thus lower battery consumption.

It is to be understood that the present invention is not limited to the particular terminology used herein. For example, the present invention is not limited to the various terms that have been used to describe LTE carrier aggregation, such as, Component Carriers (abbreviated CCs) and other terminology that is used in the above-description and by 3GPP for definition of the LTE standard. The present invention is further applicable to, for example, RANs that are defined/described using terms like multi-cell or dual-cell operation, such as with a Primary Serving Cell and potentially multiple Secondary Serving Cells, or the like.

A resource scheduler carries out scheduling of a CC on the PDCCH via downlink assignments. Control information on the PDCCH is formatted as a Downlink Control Information (DCI) message. In Rel-8, a terminal only operates with one DL and one UL CC, the association between DL assignment, UL grants and the corresponding DL and UL CCs is therefore clear. In Rel-10, two modes of Carrier Aggregation need to be distinguished. The first mode of operation is very similar to the operation of multiple Rel-8 terminals in that a DL assignment or UL grant contained in a DCI message transmitted on a CC is either valid for the DL CC itself or for associated (either via cell-specific or UE specific linking) UL CC. The second mode of operation augments a DCI message with the Carrier Indicator Field (CIF). A DCI containing a DL assignment with CIF is valid for that DL CC indicted with CIF and a DCI containing a UL grant with CIF is valid for the indicated UL CC.

Carrier Aggregation in Heterogeneous Network Deployments:

Some embodiments of the present invention are directed to carrier synchronization for networks that provide carrier aggregation. These embodiments are described in the context of a heterogeneous network having two cell layers, here referred to as "macro layer" and "pico layer", respectively, although the invention is not limited to that exemplary heterogeneous network, and other embodiments of the invention may be implemented in other networks (such as homogeneous networks). No specific assumptions are made regarding the characteristics of the different cell layers. In some embodiments, the different cell layers may correspond to cells having substantially different coverage area sizes (fundamentally defined by the coverage area of the basic control signals/channels, such as Primary Synchronization Channel, (PSS), Secondary Synchronization Channel (SSS), Physical Broadcast Channel (PBCH), Cell Specific Reference Signals (CRS), PDCCH, etc). In the exemplary heterogeneous network, a referenced "pico layer" can be a micro layer, a conventional outdoor or indoor pico layer, a layer consisting of relays, or a Home eNB (HeNB) layer.

Figures 5A, 5B:
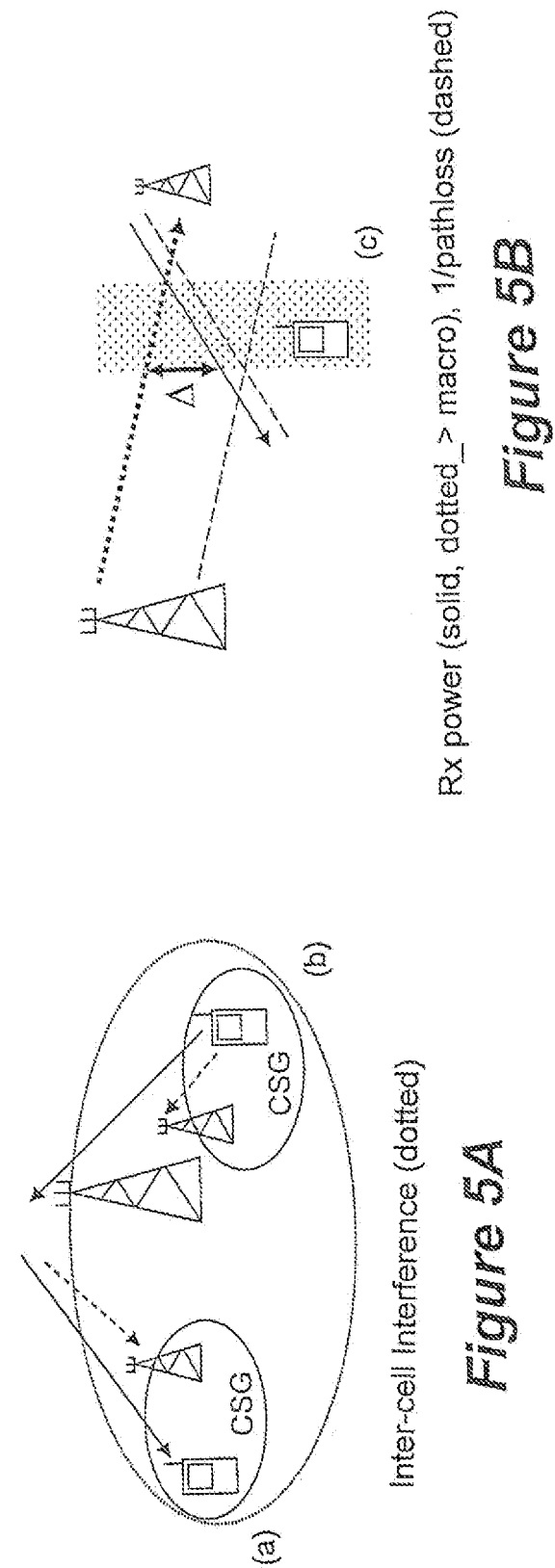
FIGS. 5A and 5B illustrate an exemplary heterogeneous network having three cells that can cause severe inter-cell interference.

Various inter-cell interference scenarios may occur for co-channel heterogeneous network deployments. FIGS. 5A and 5B illustrate an exemplary heterogeneous network having three cells that can cause severe inter-cell interference. FIG. 5A illustrates how a HeNB may cause interference towards a macro cell user that has no access to the femto cell (case (a)), and how a macro cell edge user may cause interference towards the HeNB due to no femto cell access (case (b)). FIG. 5B illustrates how interference from a macro eNB towards a pico cell (or a femto cell) edge user may increase (up to $\Delta$) if path loss based serving cell selection is used instead of strongest received downlink signal.

The major inter-cell interference issues and concerns in co-channel heterogeneous network deployments in LTE refer to interference towards resources that cannot rely on inter-cell interference coordination. For schedulable data transmissions such as PDSCH and Physical Uplink Shared Channel (PUSCH), inter-cell interference can be coordinated via soft or hard physical resource partitioning, e.g. by exchanging coordination information across layers/cells via the X2 interfaces.

It is desirable for legacy UEs to be able to operate and benefit from heterogeneous network deployments, for example by accessing pico layers to improve uplink performance even if the received signal power from the macro layer is significantly higher. Such cell selection can be achieved, for example, by use of offset in Reference Signal Received Power (RSRP) measurements carried out by the UE (corresponding to $\Delta$ in FIG. 5B). The current specification allows for an offset up to 24 dB, which should be sufficient for most heterogeneous network scenarios.

To mitigate severe downlink inter-cell interference from macro eNBs towards control regions of pico subframes, operating layers on different carriers may be necessary to ensure robust communications for legacy UEs in heterogeneous network deployments. However, such configuration implies that the whole system bandwidth will not always be available for legacy UEs and may result in reduced user throughputs. One example of reduced throughput would be a split of a contiguous system bandwidth of 20 MHz into two carriers, e.g. 10 MHz bandwidth on each carrier.

As explained above, operating different layers on different non-overlapping carrier frequencies may lead to resource-utilization inefficiency. With the heterogeneous network illustration depicted in FIG. 6, this would imply that the overall available spectrum consists of two carriers f1 and f2, with f1 and f2 being exclusively used in the macro and pico layer, respectively. In the further explanation below, it is assumed that the layers are synchronized with time aligned eNB transmissions and that f1 and f2 have non-overlapping frequency bands.

In many cases it can be assumed that the pico layer is deployed to carry the main part of the traffic, and especially, provide the highest data rates, while the macro layer provides full-area coverage to fill any coverage holes within the pico layer. In such a case it is desirable that the full bandwidth, corresponding to carrier f1 and f2, is available for data transmission within the pico layer. It may also be desirable for the full bandwidth (f1 and f2) to also be available for data transmission within the macro layer, although the importance of this may be less than ensuring full-bandwidth availability in the pico layer.

As explained above, sharing of the resources (operation on the same set of carriers) between the cell layers for data transmission can be accomplished by means of Inter-Cell Interference Coordination (ICIC) methods and operations that can be more or less dynamic depending on the coordination capabilities between the layers and radio base stations. A potentially key issue is to enable transmission of signals/channels that cannot rely on traditional ICIC methods but need to be transmitted on specific, well-defined, resources, including:

1) The synchronization signals (Primary Synchronization Channel (PSS)/Secondary Synchronization Channel (SSS));

2) The Physical Broadcast Channel (PBCH); and

3) L1/L2 control channels (Physical Downlink Control CHannel (PDCCH), Physical Control Format Indicator Channel (PCFICH) and Physical Hybrid-ARQ Indicator Channel (PHICH)).

All these signals must be transmitted on at least one downlink carrier within each cell layer. It is assumed that this primary carrier corresponds to carrier f1 in the macro layer and carrier f2 in the pico layer.

For the downlink, three cases are shown in FIGS. 7A and 7B. Case 1 differs from Case 2 (both shown in FIG. 7A) with respect to Open Subscriber Group (OSG). In Case 3 (shown in FIG. 7B), both carriers, f1 and f2, are available also at the macro layer. The three cases and exemplary operations and methods carried out by the associated RAN (e.g., by a resource scheduler therein, etc.) and UEs are further explained below.

Case 1 of Carrier Aggregation in Heterogeneous Network Deployments:

Carrier f1 (the macro PCC) should be available for PDSCH transmission also within the pico layer. A UE is controlled to access the macro layer when the path loss to the macro layer is of the same order or smaller compared to the path loss to the pico layer.

In this case, the basic downlink control signals/channels above can be transmitted on f1 also in the pico layer with no severe interference to UEs accessing the macro layer. Thus both f1 and f2 can be deployed as "normal" (release 8 compatible) carriers in the pico layer. However, a legacy UE can access f1 only close to the pico cell site where the path loss to the pico cell is much smaller than the path-loss to the macro cell, in order to avoid strong control-channel interference from the macro cell. Closer to the pico-cell border of the pico cell, Rel-10 UEs access on f2, to avoid strong interference to PSS/SSS and PBCH from the macro cell, but could be scheduled using PDSCH transmission on f1, using cross-carrier scheduling with PDCCH on f2. Note that, to avoid interference from macro Cell Specific Reference Signals (CRS), pico-cell Physical Downlink Shared Channel (PDSCH) transmission on f1 must rely on UE-specific reference signals (RS) for channel estimation, at least when the UE is close to the pico-cell border. One might consider using frequency shifts of CRS across layers but macro CRS would then cause interference towards the data resource elements of the pico.

Case 2 of Carrier Aggregation in Heterogeneous Network Deployments:

Similar to case 1, carrier f1 should be available for PDSCH transmission also within the pico layer. However, a UE should be configured to access the macro cell even when close to the pico cell.

This scenario may occur when the pico layer consists of HeNBs belonging to Closed Subscriber Groups (CSGs) and where a UE not belonging to the CSG approaches HeNB. In this case, the pico layer must not transmit the channels above (PSS/SSS, Physical Broadcast CHannel (PBCH), CRS, PDCCH, etc.) on f1 in order to avoid interference to the UEs that are accessing the macro layer in the vicinity of a pico site. Rather, the corresponding resource elements should be empty. Thus, legacy UEs can only access the pico layer on f2 while release 10 UEs can be scheduled on both f1 and f2 in the same way as for case 1.

Case 3 of Carrier Aggregation in Heterogeneous Network Deployments:

In addition to carrier f1 being available for PDSCH transmission within the pico layer, carrier f2 should be available for PDSCH transmission within the macro layer.

In this case, the macro layer must not transmit the basic downlink signals/channels above (PSS/SSS, PBCH, CRS, PDCCH, etc.) on f2 in order to avoid interference to UEs that are accessing the pico layer and that may be in a location where signals from the macro layer are received with much higher power, even though the path loss to the pico layer is substantially smaller. Rather, similar to case 2, the corresponding resource elements should be empty. Thus, legacy UEs can only access the macro layer on f1 while Rel-10 UEs can be scheduled in the macro layer on both f1 and f2. It should be noted that a UE can only be scheduled on the macro layer on f2 in such a way that it does not cause any severe interference to the pico cell, either because there is no UE being scheduled on the corresponding resource in any pico cell under the coverage area of the macro cell or by using low power for the macro-cell transmission.

Note that, in the case where all pico cells are relatively far from the macro-cell site, the macro-cell site can be configured to also transmit the basic control signals/channels (with reduced power on f2). However, this would make the macro-cell on f2 appear as a separate pico cell (located at the same point as the macro cell on f1).

Synchronization in Carrier Aggregation Systems:

Carrier aggregation in LTE Rel-10 is limited to aggregate backwards compatible component carriers, i.e. each component carrier carries basic signals like PSS/SSS, CRS, etc. However, as explained in the previous section even though these signals may be present, they can be transmitted with zero/reduced power. Transmitting with zero power means the resource elements for synchronization such as PSS/SSS, CRS, etc are reserved but modulated with zero power.

In future releases, even non-backwards compatible component carriers may be aggregated, and such carriers may not transmit PSS/SSS, CRS, etc at all. In other words, resource elements for synchronization signals may be omitted from some component carriers according to some embodiments of the present invention.

PSSS/SSS and CRS can be used at the terminal to obtain synchronization.

Time-Alignment:

Depending upon whether all component carriers are transmitted from the same site, the received carriers may or may not be time-aligned. For example, if two or more component carriers are transmitted from the same site and are time-aligned at the transmission side, they will also be time-aligned at reception. In case of intra-band carrier aggregation, tight requirements (i.e. within a fraction of the cyclic prefix) with respect to time-alignment should occur in order to maintain orthogonality. For inter-band carrier aggregation, orthogonality is already obtained due to the separation in frequency, so that no such tight time-alignment requirements are needed.

Figure 8:
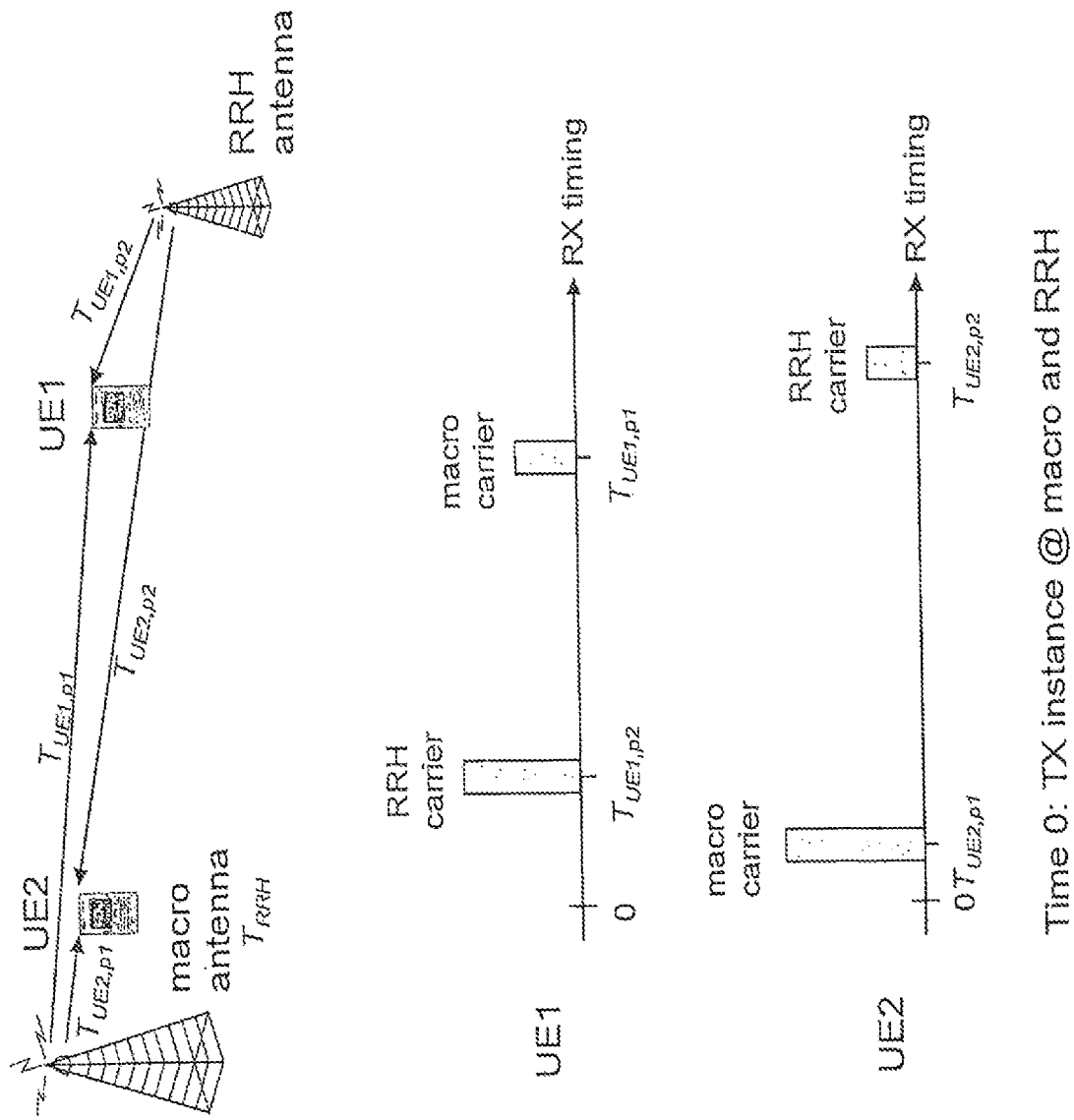
FIG. 8 illustrates a network that includes a macro antenna and a Remote Radio Head (RRH) where two component carriers are time-aligned at transmission (time 0) but are no longer time-aligned at reception.

However, when two or more component carriers are transmitted from different sites, configuring the sites to operate with co-alignment at their transmitters does not guarantee time-alignment at reception. For example, FIG. 8 shows a Remote Radio Head (RRH) deployment where two component carriers are time-aligned at transmission (time 0) but are no longer time-aligned at reception. Accordingly, with reference to FIG. 8, although the transmissions from the macro antenna and the RRH antenna are time aligned at transmission, terminal UE1 is located closer to the RRH antenna than to the macro antenna and, therefore, it receives the RRH antenna transmission before it receives the macro antenna transmission. In contrast, terminal UE2 is located closer to the macro antenna than to the RRH antenna and, therefore, it receives the macro antenna transmission before it receives the RRH antenna transmission. Thus, when terminals will receive signals from multiple transmitter locations, time alignment of the received signals cannot be assumed by the terminal.

Potential Problems with Various Potential Signaling Synchronization Approaches:

Typically, the terminal uses PSS/SSS and/or CRS to synchronize. In Rel-10 and later releases, certain component carriers may not contain such synchronization signals or only contain synchronization signals with zero/reduced power, thus making synchronization using synchronization signals of those component carriers difficult or impossible.

Depending on the deployment scenario (common origin of component carriers vs. RRH) component carriers may be time-aligned or not. Since a terminal may not know in which scenario it is operating, time-alignment of component carriers cannot be assumed, thereby making it potentially impossible to blindly re-use the synchronization status of another component carrier.

Synchronization of component carriers can be achieved by relating (e.g., correlating) the received carrier signal with the PSS/SSS and/or the CRS. However, when these signals are not present, the terminal may be unable to achieve synchronization in that manner.

Operations and Methods of Various Embodiments of the Present Invention:

In accordance with various embodiments of the present invention, synchronization can be carried out in a carrier aggregation system when component carriers are not transmitting or are transmitting with zero/reduced power PSS/SSS, CRS, etc. In some situations, the transmission power of PSS/SSS and CRS on one CC may need to be reduced (or even set to zero) or eliminated in order to protect the corresponding signals transmitted from another node. Moreover, component carrier types according to future specification may not even contain PSS/SSS and CRS. In other words, resource elements for synchronization signals may be omitted from some component carriers according to some embodiments of the present invention. In other situations, a component carrier may include synchronization signals, but due to strong interference from other cells, synchronization signals (e.g., PSS/SSS and/or CRS) may be difficult or impossible to receive.

In accordance with various embodiments of the present invention, the RAN communicates to a terminal whether it should perform individual synchronization of a component carrier using synchronization signals (e.g., timing/frequency signals such as PSS/SSS/CRS/etc.) on that component carrier or instead should perform aided synchronization, relying (partially) on synchronization signals of another component carrier. As discussed herein, individual synchronization refers a wireless terminal synchronizing and/or configuring a component carrier using synchronization signals provided on that component carrier. In contrast, aided synchronization refers to a wireless terminal synchronizing and/or configuring one component carrier using synchronization signals provided on another component carrier.

Before describing these embodiments, various further terminology used herein will be defined. As used herein, "individual synchronization" refers to operations and methods performed by a terminal to synchronize to a component carrier that provides signals needed for synchronization. In Rel-8/9, the individual synchronization signals can include PSS/SSS and/or CRS.

As used herein, "aided synchronization" refers to operations and methods performed by a terminal to synchronize to a component carrier that does not provide all signals (or provides the signals but with insufficient power) required for individual synchronization. Thus, in order to synchronize one component carrier, the terminal obtains aid from another component carrier. In one embodiment, the synchronization status (time and/or frequency) are re-used from another component carrier.

As used herein, "Synchronization Master Component Carrier (SMCC)" refers to a component carrier that enables individual synchronization.

As used herein, "Synchronization Slave Component Carrier (SSCC)" refers to a component carrier that relies on aided synchronization.

As used herein, "Synchronization Master Component Carrier List (SMCCL)" refers to a list (SMCCL) that identifies all SMCC that can be used to synchronize the SSCC. This list is specific for an SSCC, so another SSCC may have a different SMCCL.

As used herein, "Synchronization Slave Component Carrier List (SSCCL)" refers to a list that identifies all SSCC that can use a SMCC for aided synchronization. This list is specific for an SMCC, so another SMCC may have a different SSCCL.

In accordance with some embodiments, synchronization of component carriers is facilitated by the network notifying the terminal as to whether it should perform individual synchronization of the component carrier or should instead perform aided synchronization.

As will be explained in further detail below, a RAN can be configured to identify one or more CCs containing signals that can be used for synchronization by a terminal. The RAN can generate a SMCCL and/or a SSCCL based on the one or more identified CCs and can communicate the generated SMCCL and/or SSCCL to the terminal. A terminal can be correspondingly configured to receive an instruction from a RAN to add a CC and can determine whether a SMCCL and/or a SSCCL corresponding to the added CC resides in the terminal, and can perform synchronization with respect to the added CC responsive to that determination.

In accordance with first embodiments of the present invention, the RAN includes processor circuitry that is configured to identify to a terminal an SMCCL that is to be used for synchronization. For example, the terminal may be notified that component carrier n (SSCC) should perform aided synchronization using component carrier k (SMCC) identified in the SMCCL. If no SMCCL list has been provided to the terminal, then the terminal may be configured to carry out a default action for synchronization. The default action can include performing individual synchronization, where the component carrier actually does not rely on aided synchronization, or a default component carrier can be used for aided synchronization.

When there is only one SMCC, e.g. the PCC, the SMCCL can be defined by a single bit indicating whether individual synchronization or aided synchronization is to be performed by the terminal. When aided synchronization is to be performed, a single SMCC is used. If no SMCCL is provided, the terminal can be configured to carry out a default synchronization action.

Figure 9:
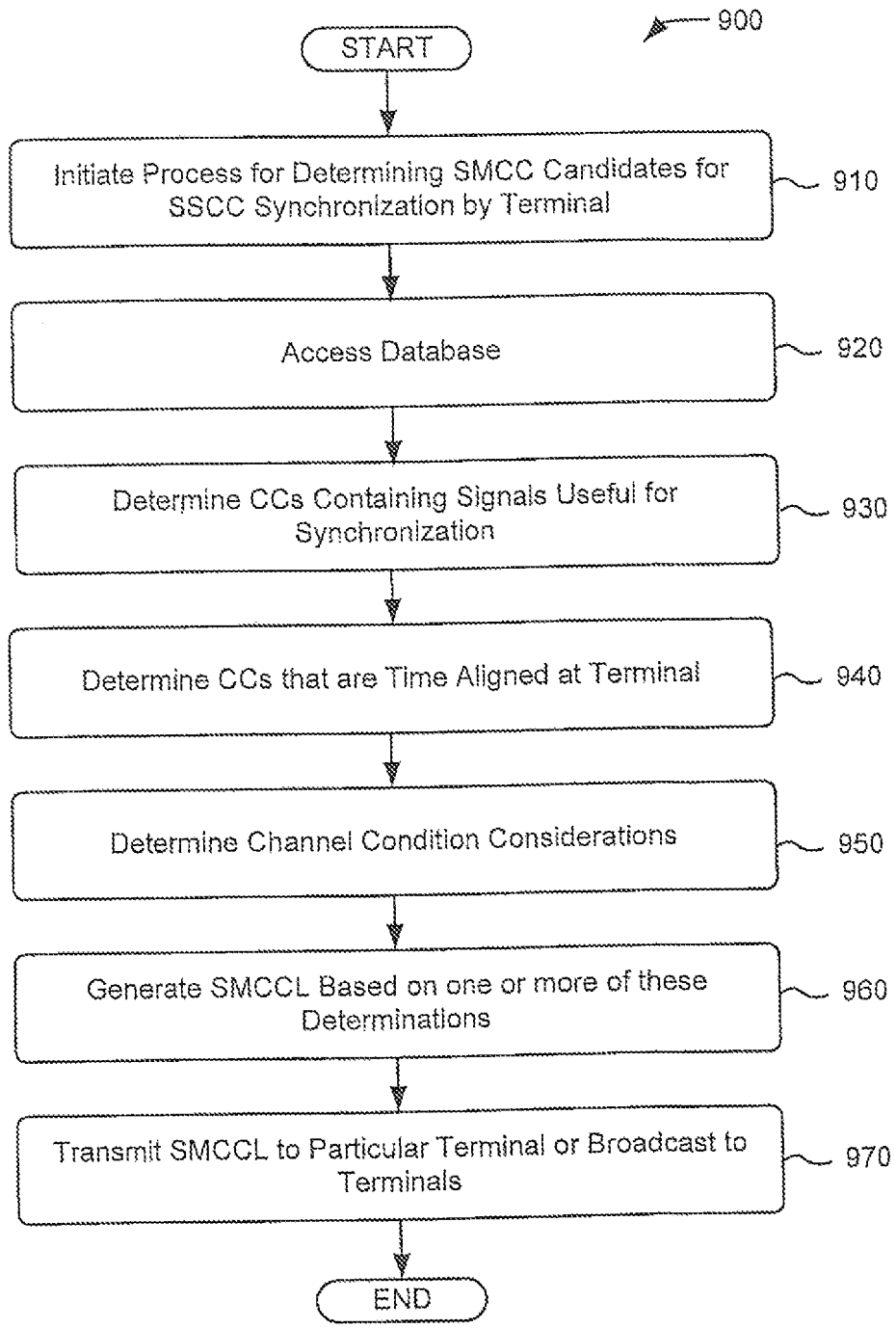
FIG. 9 illustrates a flowchart of exemplary operations and methods that may be carried out by a RAN to notify one or more terminals (UEs) of a SMCCL that should be used for synchronization of a SSCC.

FIG. 9 is a flowchart of exemplary operations 900 and methods that may be carried out by a RAN (e.g., by control processor circuitry) to notify one or more terminals (UEs) of a SMCC that should be used for synchronization of a SSCC. It is to be understood that one or more of the illustrated operations 900 may be omitted from at least some embodiments of the present invention.

In the RAN, implementation of this embodiment can include, with reference to FIG. 9, configuring the eNB (e.g., via control processor circuitry) to initiate a process at Block 910 to determine SMCC candidates for SSCC synchronization by a terminal(s) responsive to, for example, terminal acquisition of a cell and/or assignment of a new CC to a terminal. The eNB can access a local database at Block 920 that contains information, such as that identified below, that can be used to generate a SMCCL as described herein. The eNB determines at Block 930 which downlink component carriers contain signals that can be used by a terminal for synchronization. A further determination at Block 940 is made as to which downlink component carriers will be time-aligned when received at the terminal, where that determination can include determining time-alignment of a RRH relative to common origin and transmission time.

For example, the control processor circuitry can be configured to access a database residing at the eNB that identifies SMCCs that are candidates for use by a terminal for synchronization of one or more SSCCs. Which SMCC(s) are preferably used by the terminal may be identified based on which component carriers contain signals that can be used by the terminal for synchronization, which component carriers are transmitted from a same transmission site (i.e., which component carriers are time aligned at transmission and/or have a known timing offset and will remain aligned or with the known timing offset when received by the terminal), which component carriers are transmitted from different transmission sites, and/or which component carriers a terminal is configured with.

Channel quality conditions that may affect one or more of the candidate SMCCs may also be determined at Block 950 (e.g., received signal strength of one or more CCs measured at the terminal). The candidate SMCCs may be alternatively or additionally evaluated based on other predetermined or dynamically determined characteristics that can affect the ability of the terminal to use a component carrier for synchronization.

The RAN generates at Block 960 the SMCCL based on these determinations, and may generate one SMCCL that is common for all SSCCs or may generate different SMCCLs for the different SSCCs.

Once the SMCCL(s) are generated, the RAN communicates at Block 970 the SMCCL to one or more terminals which associate the received SMCCL with the SSCC. The RAN can transmit the SMCCL with dedicated signaling to the terminal and/or can distribute the SMCCL via broadcast. When the SMCCL is broadcasted, a terminal may receive the SMCCL before it is instructed to add the CC which is associated with the SMCCL. If dedicated signaling is used, the SMCCL may be part of the message instructing a terminal (UE) to add a new CC or the SMCCL may be transmitted in another message.

Figure 10:
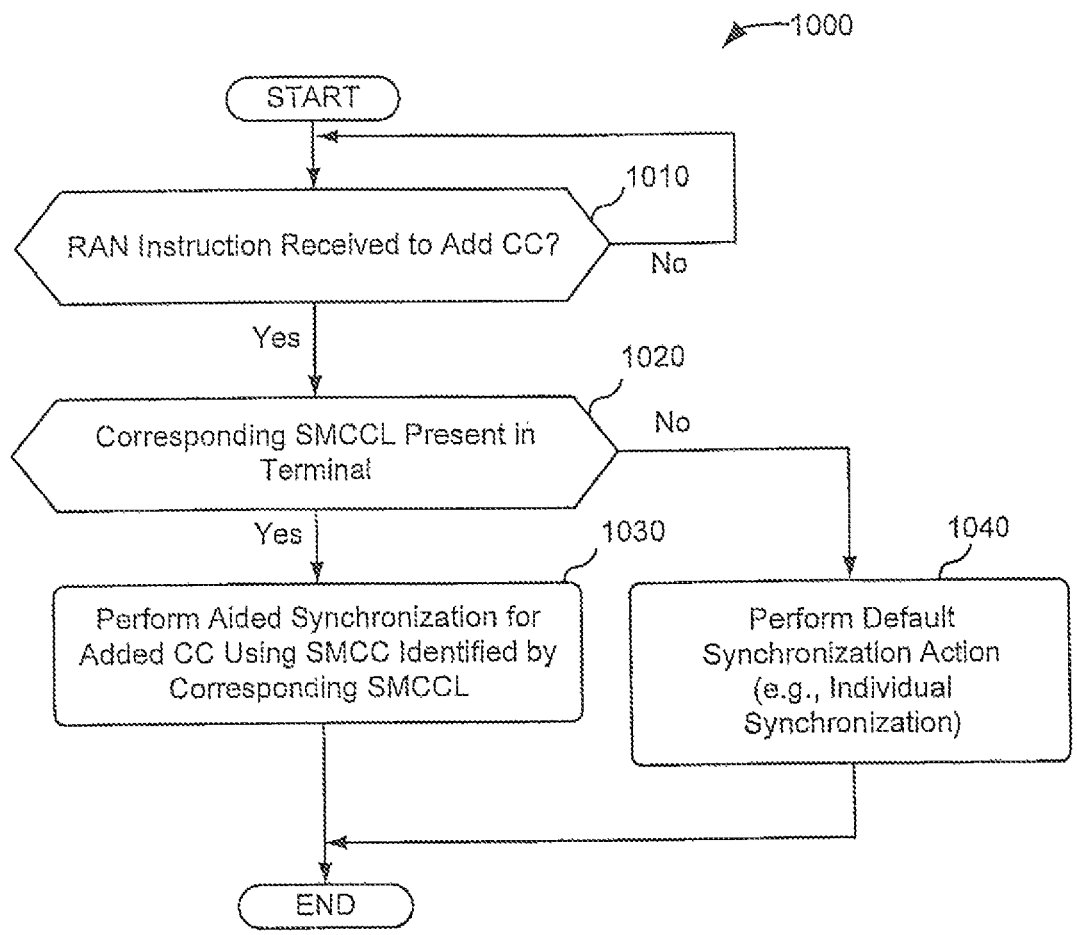
FIG. 10 illustrates a flowchart of exemplary operations and methods that may be carried out by a terminal (UE) to perform aided synchronization or individual synchronization.

FIG. 10 is a flowchart of exemplary operations 1000 and methods that may be carried out by a terminal (UE) to perform aided synchronization or individual synchronization. It to be understood that one or more of the illustrated operations 1000 may be omitted from at least some embodiments of the present invention.

Referring to FIG. 10, a terminal responds at Block 1010 to instructions from a RAN to add a component carrier by determining at Block 1020 whether it has also received a corresponding SMCCL, which may have been received via dedicated signaling and/or broadcast from the RAN. When the SMCCL is received via broadcast, the terminal may receive the SMCCL before it is instructed to add the CC which is associated with the SMCCL. If dedicated signaling is used, the SMCCL may be received as part of the message instructing the terminal (UE) to add a new CC or the SMCCL may be received in another message. When the terminal determines that it has a SMCCL associated with a SSCC, the terminal will then perform aided synchronization for the SSCC using a SMCC that is identified by the SMCCL at Block 1030. In contrast, when the terminal determines that it has not received a SMCCL that corresponds to a SSCC at Block 1040, the terminal may perform a default synchronization action. The default synchronization action can include performing individual synchronization, where the terminal performs synchronization to the component carrier without relying upon aid from another component carrier, or a default component carrier can be used for aided synchronization. For example, when a terminal has previously been assigned first and second CCs, the terminal may then be further assigned a third CC and notified, via the SMCCL, to use the first CC or second CC (either one serving as a SMCC) for aided synchronization to the third CC (serving as a SSCC).

In accordance with second embodiments of the present invention, an SSCCL is provided for carriers that allow individual synchronization. The SSCCL contains a list that identifies SSCCs that can use an associated SMCC for aided synchronization.

Figure 11:
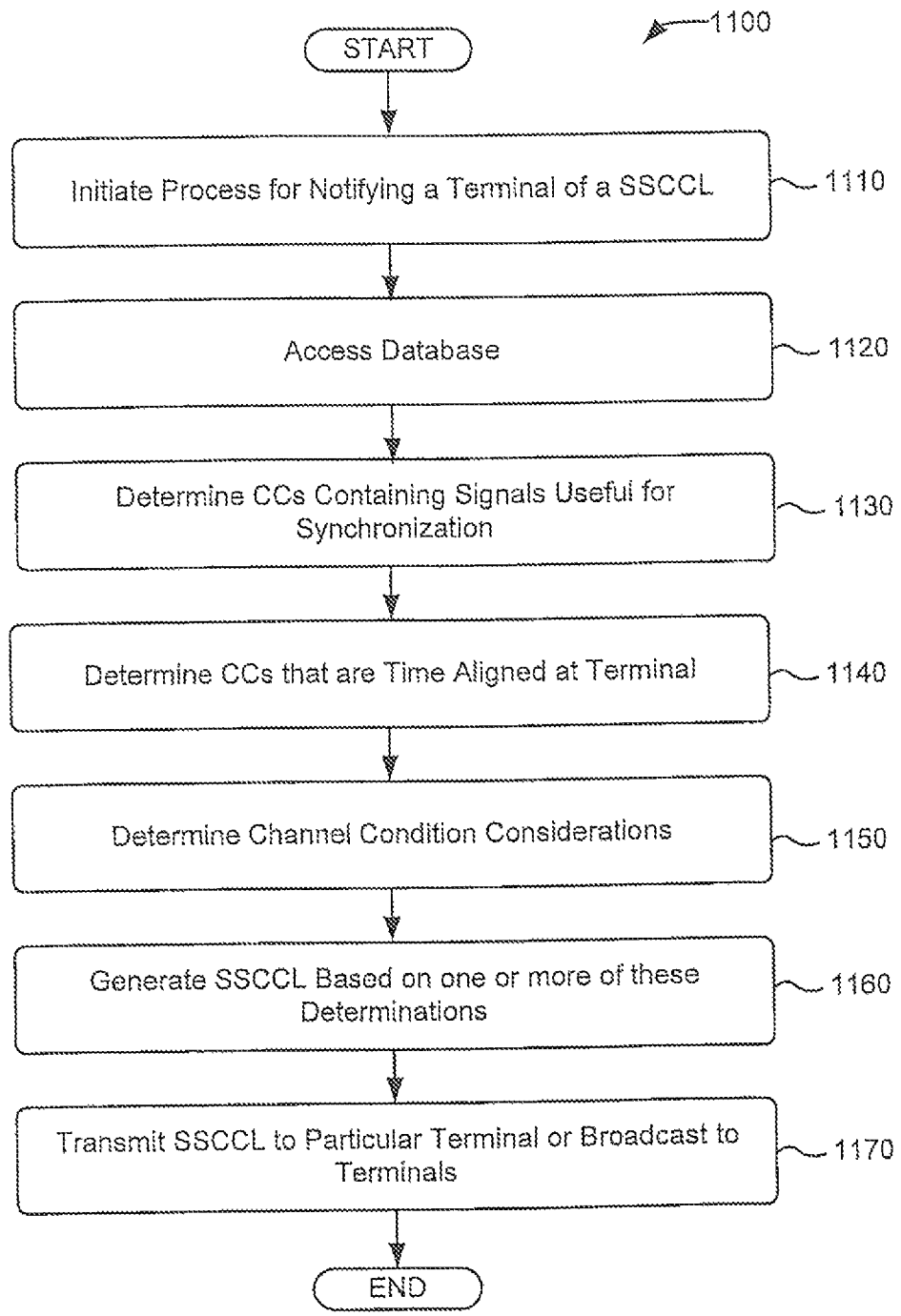
FIG. 11 illustrates a flowchart of exemplary operations and methods that may be carried out by a RAN to notify one or more terminals (UEs) of a SSCCL.

FIG. 11 is a flowchart of exemplary operations 1100 and methods that may be carried out by a RAN (e.g., by control processor circuitry) to notify one or more terminals (UEs) of a SSCCL.

In the RAN, implementation of this embodiment can include, with reference to FIG. 11, configuring the eNB to initiate a process at Block 1110 to notify a terminal of a SSCCL responsive to, for example, terminal acquisition of a cell and/or assignment of a new CC to a terminal. The eNB can access a local database at Block 1120 that contains information, such as that identified below, that can be used to generate the SSCCL as described herein.

The eNB determines at Block 1130 which downlink component carriers contain signals that can be used by a terminal for synchronization. A further determination at Block 1140 is made as to which downlink component carriers will be time-aligned when received at the terminal, where that determination can include determining time-alignment of a RRH relative to common origin and transmission time.

For example, control processor circuitry can be configured to access a database residing at the eNB that identifies SMCCs that are candidates for use by a terminal for synchronization of one or more SSCCs. Which SMCC(s) are preferably used by the terminal may be identified based on which component carriers contain signals that can be used by the terminal for synchronization, which component carriers are transmitted from a same transmission site (i.e., which component carriers are time aligned at transmission and/or have a known timing offset and will remain aligned or with the known timing offset when received by the terminal), and/or which component carriers are transmitted from different transmission sites.

Channel quality conditions that may affect one or more of the candidate SMCCs may also be determined at Block 1150 (e.g., received signal strength of one or more CCs measured at the terminal), and/or based on other predetermined or dynamically determined characteristics that can affect the ability of the terminal to use a component carrier for synchronization.

The RAN generates at Block 1160 the SSCCL based on these determinations, and may generate one SSCCL that is common for all SMCCs or may generate different SSCCL for the different SMCCs.

Once the SSCCL(s) are generated, the RAN communicates at Block 1170 the SSCCL to a terminal which associates the received SSCCL with the SMCC. The RAN can transmit the SSCCL with dedicated signaling to the terminal and/or can distribute the SSCCL via broadcast. When the SSCCL is broadcasted, a terminal may receive the SSCCL before it is instructed to add the SMCC which is associated with the SSCCL. If dedicated signaling is used, the SSCCL may be part of the message instructing a terminal (UE) to add the SMCC the SSCCL is associated with or the SSCCL may be (part of) another message.

Figure 12:
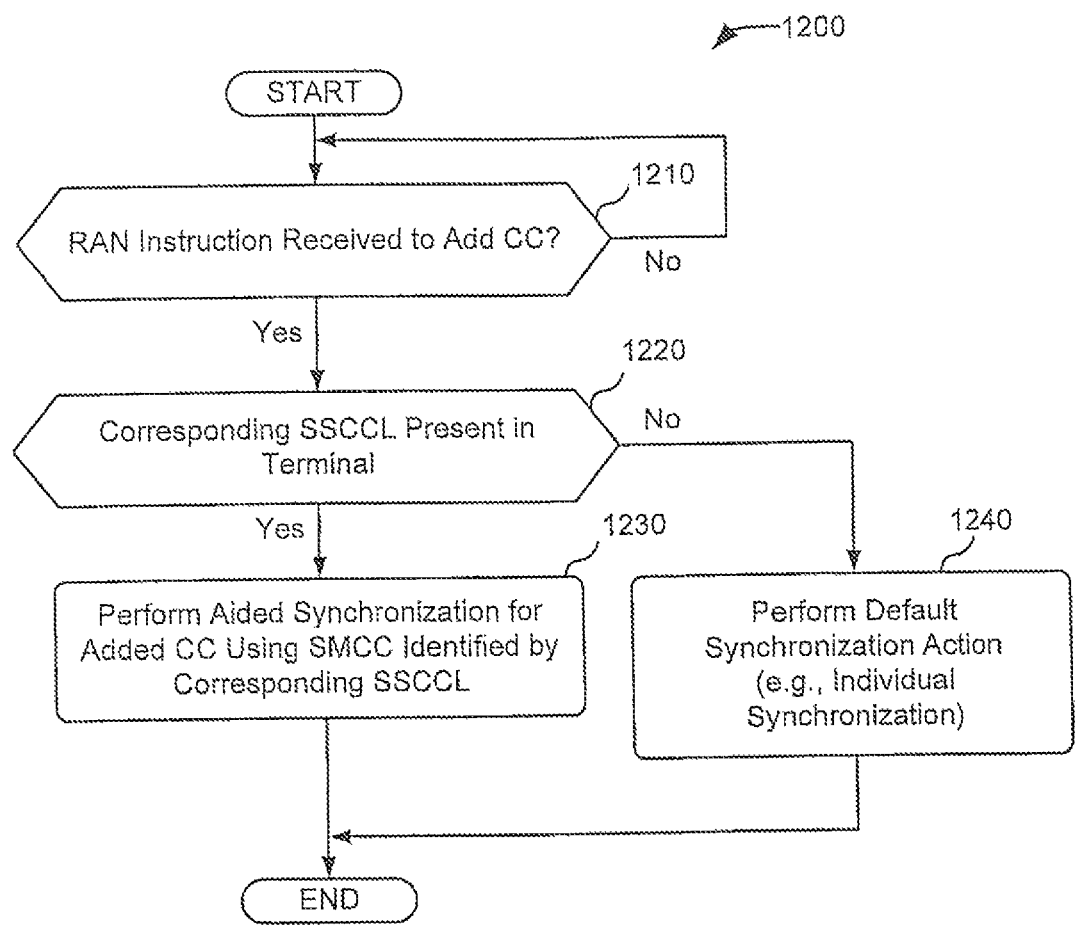
FIG. 12 illustrates a flowchart of exemplary operations and methods that may be carried out by a terminal (UE) to perform aided synchronization or individual synchronization.

FIG. 12 is a flowchart of exemplary operations 1000 and methods that may be carried out by a terminal (UE) to perform aided synchronization or individual synchronization. Referring to FIG. 12, a terminal responds at Block 1210 to instructions from a RAN to add a component carrier by determining at Block 1220 whether it has also received a SSCCL, which may have been received via dedicated signaling and/or broadcast from the RAN and which contains the currently added component carrier.

When the SSCCL is received via broadcast, the terminal may receive the SSCCL before it is instructed to add the SMCC which is associated with the SSCCL. If dedicated signaling is used, the SSCCL may be received as part of the message instructing the terminal (UE) to add the SMCC the SSCCL is associated with or the SSCCL may be received in another message. When the terminal determines that it has a SSCCL associated with a SMCC, the terminal will then perform aided synchronization for the currently added component carrier using the SMCC the SSCCL belongs to at Block 1230.

In contrast, when the terminal determines that it does not possess a SSCCL that contains the currently added component carrier at Block 1240, the terminal may perform a default synchronization action. The default synchronization action can include assuming that the currently added component carrier is an SMCC and performing individual synchronization using the currently added component carrier. In this case the terminal also checks if the currently added SMCC has an SSCCL associated with it.

According to an alternate embodiment, an additional flag is included in an "add component carrier" command that is sent from the RAN to the terminal. This flag indicates whether the terminal should perform aided synchronization or not, independent of whether the terminal possesses an SSCCL that includes the currently added component carrier. In other words, this flag overwrites a potentially stored SSCCL. Accordingly, although the terminal may have an SSCCL that includes the currently added component carrier, when the flag is set the terminal performs default synchronization, e.g. individual synchronization.

How the SMCCL and/or SSCCL lists are developed can depend upon, for example, the deployment scenario (i.e., whether the component carriers are transmitted from a common transmission site origin or are transmitted from multiple transmission sites, e.g., RRH) and whether the network transmits channels on a component carrier that enables individual synchronization. Since these dependencies are rather static, using a semi-static signaling protocol, e.g. RRC signaling, may provide certain advantages. Moreover, because these SMCCL and/or SSCCL lists are optional, in that they are not needed in all deployment scenarios, optional RRC Information Elements can be defined for SMCCL and SSCCL.

In this manner, various embodiments of the present invention can enable a terminal to perform synchronization in different deployment scenarios. The network performs various signaling that instruct the terminal to perform individual synchronization or to rely on aided synchronization. In the absence of these operational embodiments which enable terminal synchronization where it would not otherwise be possible, a terminal may either not be able to perform network access or may perform network access in a sub-optimum manner. Such sub-optimum network access could include not being able to optimally utilize network resources, dropping communication connections, etc.

To avoid these potential problems, the network could either forbid miss-alignment of received component carriers or forbid transmission of PSS/SSS, CRS, etc. with reduced power. However, forbidding miss-alignment of received component carriers could prevent deployment of RRHs and/or significantly increase the operational complexity of that deployment. Forbidding transmission of PSS/SSS, CRS, etc with reduced/zero power could make HetNet deployment sub-optimum. Since both deployment scenarios can be important for future network deployments, these two approaches are likely not feasibly approaches.

Figure 13:
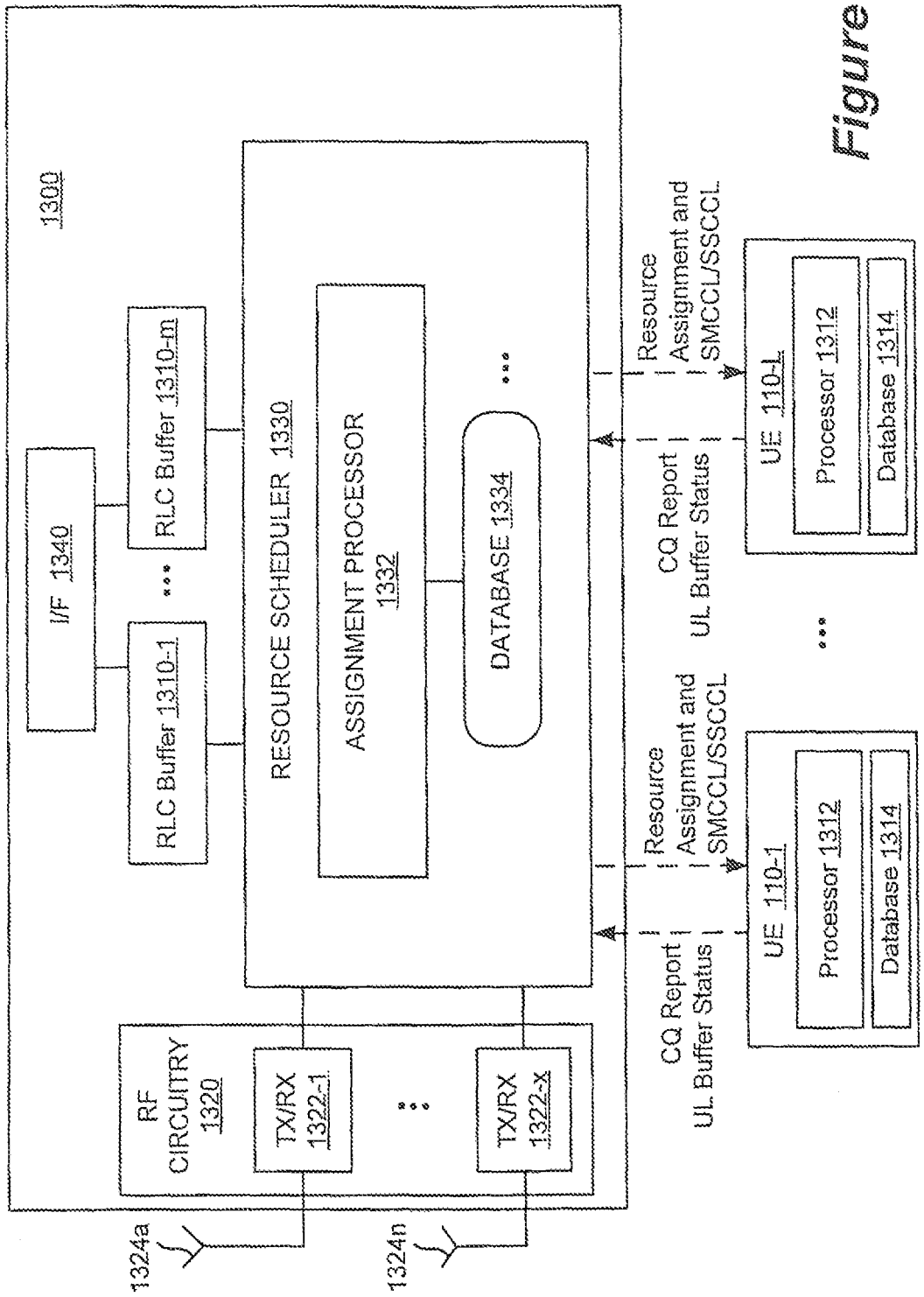
FIG. 13 is a block diagram of a portion of a RAN and a plurality of UEs that are configured according to some embodiments.

FIG. 13 is a block diagram of a portion of a network node 1300 and UEs 110-1 to 110-L that are configured according to some embodiments of the present invention. The network node 1300 may be provided as one or more of the radio base station nodes (eNodeBs) of FIG. 1. Referring to FIG. 13, the network node 1300 includes a resource scheduler 1330 that can include a resource element assignment processor 1332 and database 1334. The assignment processor 1332 may include one or more data processing and memory circuits, such as a general purpose and/or special purpose processor (e.g., microprocessor and/or digital signal processor) with on-board and/or separate memory device. The assignment processor 1332 is configured to execute computer program instructions from a memory device, described below as a computer readable medium, to assign component carriers to the UEs 110-1 to 110-L and communicate those assignments thereto. Moreover, the assignment processor 1332 is configured to execute computer program instructions from a memory device to perform one or more of the operations 900 of FIG. 9 and/or one or more of the operations 1100 of FIG. 11. The database 1134 contains information, such as the information described above regarding Embodiment 1 and/or Embodiment 2, that can be used by the assignment processor 1332 to generate SMCCLs and/or SSCCLs for communication to the UEs 110-1 to 110-L.

The network node 1300 includes RF circuitry 1320 having a plurality of transceivers (TX/RX) 1322-1 to 1322-x that communicate using different carriers through antennas 1324a-n. Although an exemplary one-to-one mapping of transceivers to antennas is shown, it is to be understood that any number of antennas and/or transceivers may be used depending upon antenna configuration and design constraints.

The network node 1300 can be configured to receive channel quality (CQ) reports and uplink (UL) buffer status reports from the UEs 110-1 to 110-L. The uplink buffer status reports can indicate how many data bits the corresponding UE has buffered awaiting uplink transmission to the RAN 1300, and can be used by the assignment processor 1332 to identify which UEs require assignment of resource elements and determine how many resource elements to assign to those UEs.

The CQ reports can indicate instantaneous downlink channel quality in both time and frequency domain. The CQ reports can be used by the assignment processor 1332, for example, as described above for Block 950 of FIG. 9 and Block 1150 of FIG. 11.

The network node 1300 can also include a plurality of radio link control (RLC) protocol buffers 1310-1 to 1310-M where downlink data that is received from the core network 130, via the interface (I/F) 1340, is buffered awaiting transmission to addressed UEs. The assignment processor 1332 can use RLC Buffer information to identify which UEs require assignment of resource elements and determine how many resource elements to assign to those UEs.

Each of the UEs 110-1 to 110-L may include a processor 1312 and database 1314. The processor 1312 may include one or more data processing and memory circuits, such as a general purpose and/or special purpose processor (e.g., microprocessor and/or digital signal processor) with on-board and/or separate memory device. The processor 1312 is configured to execute computer program instructions from a memory device, described below as a computer readable medium, to perform aided synchronization or individual synchronization according to at least some of the operations 1000 of FIG. 10 and/or at least some of the operations 1200 of FIG. 12. The database 1314 can contain a listing of component carriers that have be assigned to the UE by the assignment processor 1332 and contain a listing of associated SMCCL(s) and/or SSCCL(s) as explained above.

Figure 14:
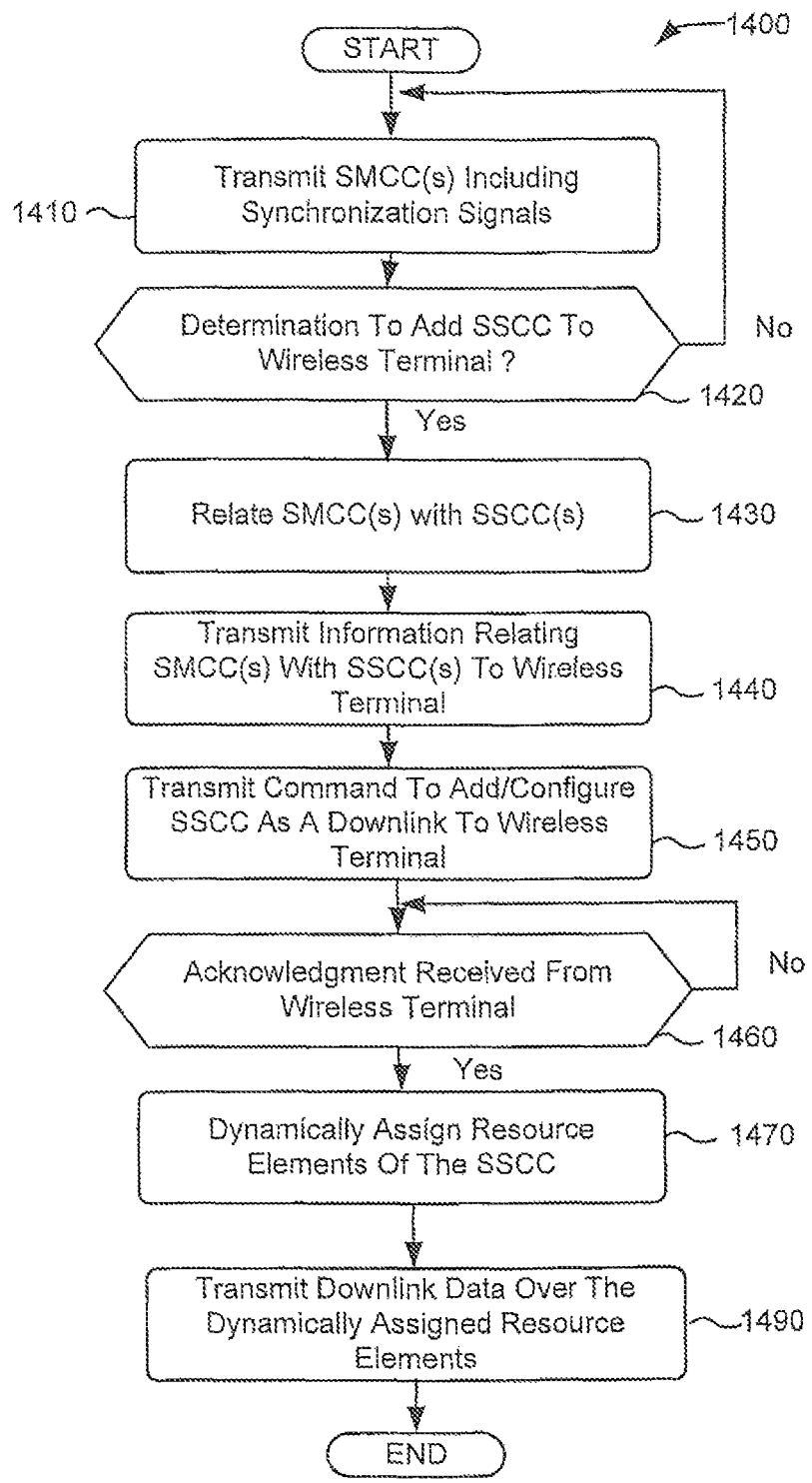
FIG. 14 illustrates a flow chart of exemplary operations and methods that may be carried out by a RAN to provide synchronization information.
Figure 15:
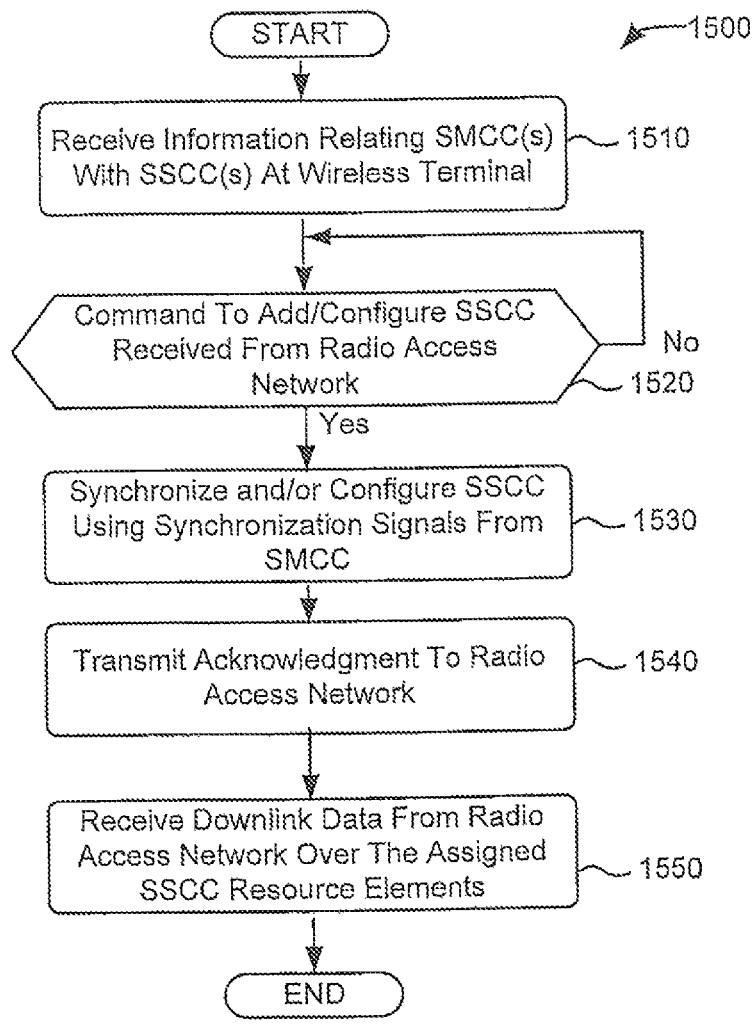
FIG. 15 illustrates a flow chart of exemplary operations and methods that may be carried out by a terminal (UE) to provide synchronization.

FIG. 14 is a flow chart illustrating operations of a network node 1300 of FIG. 13, FIG. 15 is a flow chart illustrating operations of a wireless terminal (such as user equipment 110-1 of FIG. 13), and taken together, FIGS. 14 and 15 illustrate operations of network node 1300 and user equipment providing signal synchronization according to some embodiments of the present invention. Operations of network node 1300 and user equipment 110-1 will first be discussed together with reference to FIGS. 14 and 15 to show interactions therebetween. Operations of FIGS. 14 and 15 with then be discussed separately to clarify the separate operations performed by network node 1300 and user equipment 110-1.

In particular, RF circuitry 1320 of network node 1300 may be configured to transmit an SMCC (Synchronization Master Component Carrier) including synchronization signals at Block 1410 on a first frequency. The synchronization signals, for example, may include Primary Synchronization Channel signals, Secondary Synchronization Channel signals, and/or Cell Specific Reference signals transmitted in periodic resource elements of the SMCC. According to some embodiments of the present invention, the SMCC may be configured and/or assigned as a downlink from RF circuitry 1320 to user equipment 110-1 before being used by user equipment 110-1 to synchronize an SSCC on a different frequency. The SMCC, however, is not required to serve as a downlink to user equipment 110-1 before being used by user equipment to synchronize an SSCC.

Resource scheduler 1330 may make a determination to add an SSCC (Synchronization Slave Component Carrier) on a second frequency (different than the first frequency) to user equipment 110-1 at Block 1420. Moreover, resource scheduler 1330 may relate one or more SMCC(s) (including the transmitted SMCC on the first frequency) with the assigned SSCC on the second frequency, and/or resource scheduler 1330 may relate one or more SSCC(s) (including the assigned SSCC on the second carrier) with the transmitted SMCC on the first carrier at Block 1430. As discussed above, this information relating SMCC(s) and SSCC(s) may be: a Synchronization Slave Component Carrier List (SSCCL) that identifies all SSCC(s) (including the SSCC on the second frequency to be added) that can use the transmitted SMCC on the first frequency for aided synchronization; or a Synchronization Master Component Carrier List (SMCCL) that identifies all SMCC(s) (including the transmitted SMCC on the first frequency) that can be used to synchronize the SSCC on the second frequency to be added.

The information (e.g., SSCCL and/or SMCCL) relating the transmitted SMCC on the first frequency with the SSCC to be added on the second frequency may be transmitted/received to/at user equipment 110-1 at Blocks 1440 and 1510. More particularly, the information relating the transmitted SMCC and the SSCC to be added may be intended to be used for synchronization by user equipment 110-1 upon addition of the SSCC. In addition, a command to add the SSCC (e.g., to add, configure, and/or activate the SSCC) on the second frequency as a downlink may be transmitted/received to/at user equipment 110-1 at Blocks 1450 and 1520.

By relating SMCC(s) with SSCC(s) at Block 1430 for the particular user equipment 110-1 after the determination to add (e.g., add, configure, and/or activate) the SSCC to/for user equipment 110-1 at Block 1420, resource scheduler 1330 may dynamically relate SMCC(s) with SSCC(s) for specific user equipment 110-1 based in part on a current location of user equipment 110-1, current signal strength/quality received at/from user equipment 110-1, time delays of signals received at/from user equipment 110-1, etc. According to some embodiments, resource scheduler 1330 may relate SMCC(s) and SSCC(s) transmitted from the same or different network nodes/antennas provided that the related SMCC(s) and SSCC(s) are time aligned at user equipment 110-1. With dynamic relation of SMCC(s)/SSCC(s), for example, the information relating SMCC(s)/SSCC(s) may be transmitted at Block 1440 before, after, and/or concurrently with the command to add (e.g., to add, configure, and/or activate) the SSCC at Block 1450 provided that the information is provided before user equipment 110-1 synchronizes the SSCC.

While FIGS. 14 and 15 illustrate a particular order of operations of Blocks 1410, 1420, 1430, 1440, 1450, 1510, and 1520 according to some embodiments of the present invention, other orders of operations may be provided according to other embodiments of the present invention. Resource scheduler 1330, for example, may statically relate SMCC(s) with SSCC(s) based on a location from which the SMCC(s) and SLCC(s) are transmitted. Stated in other words, resource scheduler 1330 may relate SMCC(s) with SSCC(s) that are transmitted from a same antenna/location, because SMCC(s) and SSCC(s) transmitted from a same location may be time aligned (on reception) regardless of a location of the receiving user equipment 110-1. With statically related SMCC(s) and SSCC(s), information correlating SMCC(s) with SSCC(s) may be transmitted/received to/at user equipment 110-1 at Blocks 1440 and 1510, for example, before the determination to add the SSCC to user equipment 110-1 at Block 1420, or after the determination at Block 1420 as discussed above with respect to dynamic relation of SMCC(s)/SSCC(s).

According to some embodiments of the present invention, the SMCC on the first frequency may be configured and assigned as a downlink from network node 1300 to user equipment 110-1. Accordingly, transmitting the information relating the SMCC with the SSCC at Block 1440 may include transmitting the information over the SMCC to user equipment 110-1, and/or transmitting the command to add the SSCC at Block 1450 may include transmitting the command over the SMCC to user equipment 110-1. The information relating the SMCC with the SSCC, for example, may be transmitted at Block 1440 substantially concurrently with transmitting the command to add the SSCC at Block 1450 over the SMCC on the first frequency.

According to some embodiments of the present invention, transmitting the information relating the SMCC with the SSCC at Block 1440 may include broadcasting the information over a third frequency that is different than the first frequency of the SMCC and different than the second frequency of the SSCC. Such broadcast information may be made available for all user equipment 110 within range of the broadcast. Accordingly, the broadcast information relating SMCC(s) with SSCC(s) may be statically determined based on locations/antennas from which the SMCC(s) and SSCC(s) are transmitted.

Responsive to receiving the information relating SMCC(s) with SSCC(s) at Block 1510 and responsive to receiving the command to add the SSCC at Block 1520, user equipment 110-1 may synchronize and/or configure the SSCC on the second frequency using synchronization signals from the related SMCC on the first frequency at Block 1530. By relating the added SSCC on the second frequency with a time aligned SMCC on the first frequency, user equipment 110-1 may synchronize the added SSCC without requiring any synchronization signals to be provided/received over the SSCC. Accordingly, the SSCC may be transmitted without synchronization signals (e.g., the SSCC may be transmitted with synchronization resource elements that are reserved but modulated with zero/low power, the SSCC may actually be transmitted without synchronization signals, or the SSCC may be transmitted without resource elements for synchronization signals).

User equipment 110-1 may transmit an acknowledgement to network node 1300 at Block 1540 indicating that the SSCC on the second frequency has been synchronized and/or configured at user equipment 110-1, and the acknowledgement may be received by network node 1300 Block 1460. Once the SSCC has been configured at Blocks 1460 and 1540, resource scheduler 1330 may dynamically assign resource elements of the configured SSCC at Block 1470 to provide downlink data transmission over the dynamically assigned resource elements 1490. Accordingly, user equipment 110-1 may receive the downlink data transmissions at Block 1550 using the dynamically assigned resource elements of the configured SSCC.

User equipment 110-1 may use the synchronization signals from the related SMCC for the SSCC, for example, because: the SSCC may be transmitted without synchronization signals (e.g., the SSCC may be transmitted with synchronization resource elements that are reserved but modulated with zero/low power, the SSCC may actually be transmitted without synchronization signals, or the SSCC may be transmitted without resource elements for synchronization signals); and/or synchronization signals of the SSCC may be subject to interference from a different network node/antenna transmitting on the same frequency as the SSCC.

In addition, network node 1300 may be configured to transmit a flag with the command to add (e.g., to add, configure, and/or activate) the SSCC at Block 1450 to user equipment at Block 1520, and the flag may have one of a first value and a second value. The first value may instruct user equipment 110-1 to synchronize and/or configure the second carrier using the synchronization signals of the first carrier as discussed above at Blocks 1440, 1450, 1460, 1520, 1530, and 1540. The second value may instruct user equipment 110-1 to synchronize and/or configure SSCC according to a default synchronization without using the synchronization signals of SMCC. Accordingly, user equipment 110-1 may be configured to synchronize and/or configure the second carrier 1503 using the synchronization signals of the first carrier responsive to receiving the flag having the first value and synchronizing and/or configuring the second carrier 1503 without using the synchronization signals of the first carrier responsive to receiving the flag having the second value.

By way of example, a Primary Component Carrier (PCC) on a third frequency (different than the first and second frequencies of the SMCC and the SSCC) may be configured as a downlink carrier for transmissions from network node 1300 to user equipment 110-1, and the PCC may be configured before the command (to add the SSCC) is transmitted/received to/at user equipment 110-1 at Blocks 1450 and 1520. Responsive to receiving the flag having the first value, user equipment 110-1 may synchronize and/or configure the SSCC on the second frequency using the synchronization signals of the related SMCC on the first frequency. Responsive to receiving the flag having the second value, user equipment 110-1 may be configured to synchronize and/or configure the SSCC on the second frequency using synchronization signals of the PCC on the third frequency.

According to other embodiments of the present invention, the command to add (e.g., to add, configure, and/or activate) the SSCC may be transmitted using a carrier on a third frequency (different than the first and second frequencies of the SMCC and the SSCC). Responsive to receiving the flag having the first value, user equipment 110-1 may synchronize and/or configure the SSCC on the second frequency using the synchronization signals of the related SMCC on the first frequency. Responsive to receiving the flag having the second value, user equipment 110-1 may synchronize and/or configure the SSCC on the second frequency using synchronization signals of the third carrier on the third frequency. In other words, user equipment 110-1 may use synchronization signals of the carrier used to transmit the command to synchronize and/or configure the SSCC.

According to yet other embodiments of the present invention, user equipment 110-1 may be configured to synchronize and/or configure the SSCC on the second frequency using the synchronization signals of the related SMCC on the first frequency responsive to receiving the flag having the first value. Responsive to receiving the flag having the second value, user equipment 110-1 may synchronize and/or configure the SSCC on the second frequency using synchronization signals of the SSCC on the second frequency. In other words, the second value of the flag may prompt user equipment 110-1 to synchronize and/or configure the SSCC using its own synchronization signals. For example, the SSCC may be transmitted with synchronization resource elements that are modulated with low power, and resource scheduler 1330 may transmit the flag having the second value when user equipment 110-1 is sufficiently near network node 1300 and/or subject to sufficiently low interference that the low power synchronization signals can be received and used.

Once user equipment 110-1 receives a command to add (e.g., to add, configure, and/or activate) a new SSCC, user equipment 110-1 may immediately time/frequency synchronize the SSCC using the synchronization signals of the related SMCC responsive to receiving the command, or user equipment 110-1 may wait to receive an activation command before time/frequency synchronizing the SSCC using the synchronization signals of the related SMCC (responsive to receiving the activation command). Once user equipment 110-1 time/frequency synchronizes the added SSCC, user equipment 110-1 may monitor a control channel (e.g., a Physical Downlink Control Channel or PDCCH) for the added SSCC for downlink assignments (used by resource scheduler 1330 to assign SSCC resource elements for downlink data transmissions). Responsive to receiving a downlink assignment for the added SSCC from resource scheduler 1330, user equipment 110-1 may receive downlink data transmissions from network node 1300 over the assigned resource elements of the SSCC.

Operations of network node 1300 will now be discussed separately with respect to the flow chart of FIG. 14 to clarify operations thereof. RF circuitry 1320 of network node 1300 may be configured to transmit an SMCC (Synchronization Master Component Carrier) including synchronization signals at Block 1410 on a first frequency. The synchronization signals, for example, may include Primary Synchronization Channel signals, Secondary Synchronization Channel signals, and/or Cell Specific Reference signals transmitted in periodic resource elements of the SMCC. According to some embodiments of the present invention, the SMCC may be configured and/or assigned as a downlink from RF circuitry 1320 to user equipment 110-1 before being used by user equipment 110-1 to synchronize an SSCC on a different frequency. The SMCC, however, is not required to serve as a downlink to user equipment 110-1 before being used by user equipment to synchronize an SSCC.

Resource scheduler 1330 may make a determination to add an SSCC (Synchronization Slave Component Carrier) on a second frequency (different than the first frequency) to user equipment 110-1 at Block 1420. Moreover, resource scheduler 1330 may relate one or more SMCC(s) (including the transmitted SMCC on the first frequency) with the assigned SSCC on the second frequency, and/or resource scheduler 1330 may relate one or more SSCC(s) (including the assigned SSCC on the second carrier) with the transmitted SMCC on the first carrier at Block 1430. As discussed above, this information relating SMCC(s) and SSCC(s) may be: a Synchronization Slave Component Carrier List (SSCCL) that identifies all SSCC(s) (including the SSCC on the second frequency to be added) that can use the transmitted SMCC on the first frequency for aided synchronization; or a Synchronization Master Component Carrier List (SMCCL) that identifies all SMCC(s) (including the transmitted SMCC on the first frequency) that can be used to synchronize the SSCC on the second frequency to be added.

The information (e.g., SSCCL and/or SMCCL) relating the transmitted SMCC on the first frequency with the SSCC to be added on the second frequency may be transmitted to user equipment 110-1 at Block 1440. More particularly, the information relating the transmitted SMCC and the SSCC to be added may be intended to be used for synchronization by user equipment 110-1 upon addition of the SSCC. In addition, a command to add (e.g., to add, configure, and/or activate) the SSCC on the second frequency as a downlink may be transmitted to user equipment 110-1 at Block 1450.

By relating SMCC(s) with SSCC(s) at Block 1430 for the particular user equipment 110-1 after the determination to add (e.g., to add, configure, and/or activate) the SSCC to/for user equipment 110-1 at Block 1420, resource scheduler 1330 may dynamically relate SMCC(s) with SSCC(s) for specific user equipment 110-1 based in part on a current location of user equipment 110-1, current signal strength/quality received at/from user equipment 110-1, time delays of signals received at/from user equipment 110-1, etc. According to some embodiments, resource scheduler 1330 may relate SMCC(s) and SSCC(s) transmitted from the same or different network nodes/antennas provided that the related SMCC(s) and SSCC(s) are time aligned at user equipment 110-1. With dynamic relation of SMCC(s)/SSCC(s), for example, the information relating SMCC(s)/SSCC(s) may be transmitted at Block 1440 before, after, and/or concurrently with the command to add (to add, configure, and/or activate) the SSCC at Block 1450 provided that the information is provided before user equipment 110-1 synchronizes the SSCC.

While FIG. 14 illustrates a particular order of operations of Blocks 1410, 1420, 1430, 1440, and 1450 according to some embodiments of the present invention, other orders of operations may be provided according to other embodiments of the present invention. Resource scheduler 1330, for example, may statically relate SMCC(s) with SSCC(s) based on a location from which the SMCC(s) and SLCC(s) are transmitted. Stated in other words, resource scheduler 1330 may relate SMCC(s) with SSCC(s) that are transmitted from a same antenna/location, because SMCC(s) and SSCC(s) transmitted from a same location may be time aligned (on reception) regardless of a location of the receiving user equipment 110-1. With statically related SMCC(s) and SSCC(s), information correlating SMCC(s) with SSCC(s) may be transmitted to user equipment 110-1 at Block 1440, for example, before the determination to add the SSCC to user equipment 110-1 at Block 1420, or after the determination at Block 1420 as discussed above with respect to dynamic relation of SMCC(s)/SSCC(s).

According to some embodiments of the present invention, the SMCC on the first frequency may be configured and assigned as a downlink from network node 1300 to user equipment 110-1. Accordingly, transmitting the information relating the SMCC with the SSCC at Block 1440 may include transmitting the information over the SMCC to user equipment 110-1, and/or transmitting the command to add the SSCC at Block 1450 may include transmitting the command over the SMCC to user equipment 110-1. The information relating the SMCC with the SSCC, for example, may be transmitted at Block 1440 substantially concurrently with transmitting the command to add the SSCC at Block 1450 over the SMCC on the first frequency.

According to some embodiments of the present invention, transmitting the information relating the SMCC with the SSCC at Block 1440 may include broadcasting the information over a third frequency that is different than the first frequency of the SMCC and different than the second frequency of the SSCC. Such broadcast information may be made available for all user equipment 110 within range of the broadcast. Accordingly, the broadcast information relating SMCC(s) with SSCC(s) may be statically determined based on locations/antennas from which the SMCC(s) and SSCC(s) are transmitted.

Upon receiving an acknowledgement from user equipment 110-1 (indicating synchronization/configuration of the SSCC at user equipment 110-1) at network node 1300 at Block 1460, resource scheduler 1330 may dynamically assign resource elements of the configured SSCC at Block 1470 to provide downlink data transmission over the dynamically assigned resource elements 1490 to user equipment 110-1 at Block 1490.

Operations of user equipment 110-1 will now be discussed separately with respect to the flow chart of FIG. 15 to clarify operations thereof.

In particular, the information (e.g., SSCCL and/or SMCCL) relating the transmitted SMCC on the first frequency with the SSCC to be added on the second frequency may be received (from network node 1300) at user equipment 110-1 at Block 1510. More particularly, the information relating the transmitted SMCC and the SSCC to be added may be intended to be used by user equipment 110-1 for synchronization upon addition of the SSCC. In addition, a command to add (e.g., to add, configure, and/or activate) the SSCC on the second frequency as a downlink may be received (from network node 1300) at user equipment 110-1 at Block 1520.

While FIG. 15 illustrates a particular order of operations of Blocks 1510 and 1520 according to some embodiments of the present invention, other orders of operations may be provided according to other embodiments of the present invention. With statically related SMCC(s) and SSCC(s), information correlating SMCC(s) with SSCC(s) may be received at user equipment 110-1 at Block 1510, for example, before or after network node 1300 determines to add the SSCC to user equipment 110-1.

According to some embodiments of the present invention, the SMCC on the first frequency may be configured and assigned as a downlink from network node 1300 to user equipment 110-1. Accordingly, receiving the information relating the SMCC with the SSCC at Block 1510 may include receiving the information over the SMCC at user equipment 110-1, and/or receiving the command to add the SSCC at Block 1520 may include receiving the command over the SMCC at user equipment 110-1. The information relating the SMCC with the SSCC, for example, may be received at Block 1510 substantially concurrently with receiving the command to add the SSCC at Block 1520 over the SMCC on the first frequency.

According to some embodiments of the present invention, receiving the information relating the SMCC with the SSCC at Block 1510 may include receiving a broadcast of the information over a third frequency that is different than the first frequency of the SMCC and different than the second frequency of the SSCC. Such broadcast information may be available for all user equipment 110 within range of the broadcast. Accordingly, the broadcast information relating SMCC(s) with SSCC(s) may be statically determined based on locations/antennas from which the SMCC(s) and SSCC(s) are transmitted.

Responsive to receiving the information relating SMCC(s) with SSCC(s) at Block 1510 and responsive to receiving the command to add the SSCC at Block 1520, user equipment 110-1 may synchronize and/or configure the SSCC on the second frequency using synchronization signals from the related SMCC on the first frequency at Block 1530. By relating the added SSCC on the second frequency with a time aligned SMCC on the first frequency, user equipment 110-1 may synchronize the added SSCC without requiring any synchronization signals to be provided/received over the SSCC. Accordingly, the SSCC may be transmitted without synchronization signals (e.g., the SSCC may be transmitted with synchronization resource elements that are reserved but modulated with zero/low power, the SSCC may actually be transmitted with no synchronization signals, or the SSCC may be transmitted without resource elements for synchronization signals).

User equipment 110-1 may transmit an acknowledgement to network node 1300 at Block 1540 indicating that the SSCC on the second frequency has been synchronized and/or configured at user equipment 110-1. Once the SSCC has been configured at Block 1460, resource scheduler 1330 may dynamically assign resource elements of the configured SSCC to provide downlink data transmission over the dynamically assigned resource elements 1490. Accordingly, user equipment 110-1 may receive the downlink data transmissions at Block 1550 using the dynamically assigned resource elements of the configured SSCC. User equipment 110-1 may use the synchronization signals from the related SMCC for the SSCC, for example, because: the SSCC may be transmitted without synchronization signals (e.g., the SSCC may be transmitted with synchronization resource elements that are reserved but modulated with zero/low power, the SSCC may actually be transmitted with no synchronization signals, or the SSCC may be transmitted without resource elements for synchronization signals); and/or synchronization signals of the SSCC may be subject to interference from a different network node/antenna transmitting on the same frequency as the SSCC.

According to additional embodiments, user equipment 110-1 may obtain synchronization in a carrier aggregation system for component carriers that do not transmit synchronization signals (e.g., PSS/SSS, CRS, etc.) and/or that transmit synchronization signals (e.g., PSS/SSS, CRS, etc.) with zero/reduced power. Synchronization of component carriers may be achieved by defining certain rules how user equipment 110-1 can obtain synchronization even for component carriers that do not transmit synchronization signals and/or that transmit synchronization signals with zero/reduced power. Accordingly, the radio access network may need to ensure that the component carriers used for synchronization according to such rules represent a valid synchronization state for each new component carrier added to user equipment 110-1.

Figure 16:
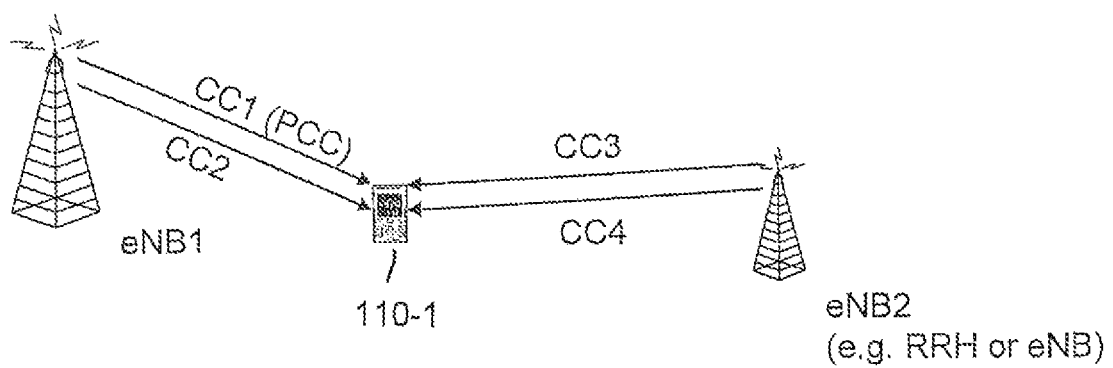
FIG. 16 illustrates a network that includes spaced apart antennas with two time aligned component carriers transmitted from each antenna.

FIG. 16 illustrates a deployment scenario where user equipment 110-1 can receive component carriers from multiple different network nodes (e.g., eNodeB's and/or remote radio heads). As shown in FIG. 16, for example, user equipment 110-1hg may be configured with downlink component carrier CC1 (which may server as a primary component carrier or PCC for user equipment 110-1) transmitted from network node eNB1 and with downlink component carrier CC3 transmitted from network node eNB2. Both downlink component carriers CC1 and CC3 may include respective synchronization signals (e.g., PSS/SSS and/or CRS). Moreover, component carrier CC3 is transmitted from network node eNB2 that is physically separated from network node eNB1 from which component carrier CC1 is transmitted. Stated in other words, component carriers CC1 and CC3 may be transmitted from different antenna locations of the radio access network.

In addition to transmitting component carrier CC1, network node eNB1 may also transmit downlink component carrier CC2 so that downlink component carriers CC1 and CC2 are transmitted from the same antenna location of the radio access network. Similarly, network node eNB2 may transmit downlink component carrier CC4 in addition to transmitting downlink component carrier CC3, so that downlink component carriers CC3 and CC4 are transmitted from the same antenna location of the radio access network. Accordingly, downlink component carriers CC1 and CC2 may be time aligned due to a same point of origin at network node eNB1, and downlink component carriers CC3 and CC4 may be time aligned due to a same point of origin at network node eNB2. Moreover, network nodes eNB2 and eNB2 may be separate (spaced apart) eNodeB network nodes. In an alternative, network node eNB1 may be an eNodeB network node, and network node eNB2 may be a remote radio head (RRH) that is connected to network node eNB1.

If a new component carrier CC2 is added (e.g., added, configured, and/or activated) for user equipment 110-1, synchronization signals from previously configured component carrier CC1 may be used by user equipment 110-1 to time and/or frequency synchronize new component carrier CC2. Because component carriers CC1 and CC2 are both transmitted from the same network node eNB1, component carriers CC1 and CC2 are time aligned, and synchronization signals of component carrier CC1 can be used by user equipment 110-1 to time and/or frequency synchronize component carrier CC2. Because a primary component carrier (PCC) such as component carrier CC1 is configured for user equipment before configuring any secondary carriers such as component carrier CC2, synchronization signals from the primary component carrier may be used by user equipment 110-1 to synchronize any secondary component carriers transmitted from the same network node (e.g., eNB1) as the primary component carrier (e.g., CC1). Stated in other words, component carrier CC1 (such as a PCC) may be used as a synchronization reference component carrier (also referred to as a reference component carrier (RCC)) when adding (e.g., adding, configuring, and/or activating) new component carrier CC2. When adding (adding, configuring, and/or activating) new component carrier CC2, however, synchronization signals from component carrier CC3 may not be used to synchronize component carrier CC2 because component carriers CC2 and CC3 are transmitted from different antenna locations and are thus not time aligned at user equipment 110-1. According to some embodiments, component carrier CC1 may be a primary component carrier (PCC) for user equipment 110-1, and the command to add (e.g., add, configure, and/or activate) component carrier CC2 may be transmitted over component carrier CC1 that is the primary component carrier.

According to some embodiments, user equipment 110-1 may always use synchronization signals of the primary component carrier (e.g., component carrier CC1) to synchronize and/or configure a secondary component carrier (e.g., component carrier CC1) transmitted form the same network node (e.g., network node eNB1) as the primary component carrier. In other words, user equipment 110-1 may always perform aided synchronization when adding a secondary component carrier that is transmitted from the same network node as the primary component carrier, and user equipment 110-1 may not even attempt to perform individual synchronization in such a situation.

When adding component carrier CC2 according to some other embodiments, user equipment 110-1 may first attempt to configure and/or synchronize new component carrier CC2 individually using synchronization signals of the new component carrier CC2. If user equipment 110-1 is unable to synchronize the new component carrier CC2 individually (e.g., because new component carrier CC2 does not include synchronization signals, because synchronization signals of component carrier CC2 are subject to interference, and/or because synchronization signals of component carrier CC2 are transmitted with no/insufficient power), then user equipment 110-1 may perform aided synchronization using synchronization signals of the primary component carrier CC1 to configure and/or synchronize new component carrier CC2.

According to still other embodiments, a flag may be used to indicate whether to use individual or aided synchronization when configuring and/or synchronizing new component carrier CC2. The flag may be either an explicit parameter that is signaled, or an implicit parameter that is derived from another parameter that is signaled. Assuming that a parameter "X" is only transmitted with the command to add component carrier CC2 when aided synchronization (using PCC) is to be performed, the implicit flag may be that when the parameter "X" is present, the PCC synchronization signals are used to configure and/or synchronize new component carrier CC2 (referred to as aided synchronization), and when the parameter "X" is not present, synchronization signals of component carrier CC2 are used to configure and/or synchronize component carrier CC2 (referred to as individual synchronization). The parameter "X", for example, may be an indication of a cyclic prefix length of new component carrier CC2, and/or a downlink transmission bandwidth of new component carrier CC2.

If a command to add (e.g., add, configure, and/or activate) new component carrier CC4 is transmitted to user equipment 110-1 over component carrier CC3, synchronization signals from component carrier CC3 (used to transmit the command) may be used by user equipment 110-1 to time and/or frequency synchronize new component carrier CC4. Because component carriers CC3 and CC4 are both transmitted from the same network node eNB2, component carriers CC3 and CC4 are time aligned, and synchronization signals of component carrier CC3 can be used by user equipment 110-1 to time and/or frequency synchronize component carrier CC4. Because component carrier CC3 is configured for user equipment before transmitting the command to add (e.g., add, configure, and/or activate) new component carrier CC4, synchronization signals from component carrier CC3 may be used by user equipment 110-1 to synchronize new component carrier CC4 that is transmitted from the same network node (e.g., eNB2). Stated in other words, component carrier CC3 that is used to transmit the command to add (e.g., add, configure, and/or activate) new component carrier CC4 may also be used as a synchronization reference (also referred to as a reference component carrier (RCC)) when adding (e.g., adding, configuring, and/or activating) new component carrier CC4. When adding (e.g., adding, configuring, and/or activating) new component carrier CC4, however, synchronization signals from component carrier CC1 may not be used to synchronize component carrier CC4 because component carriers CC1 and CC4 are transmitted from different antenna locations and are thus not time aligned at user equipment 110-1. According to some embodiments, component carrier CC3 that is used to transmit the command to add (e.g., add, configure, and/or activate) component carrier CC4 may be a primary component carrier (PCC).

According to some embodiments, user equipment 110-1 may always use synchronization signals of the reference component carrier (e.g., component carrier CC3 that is used to transmit the command to add (add, configure, and/or activate) new component carrier CC4) to synchronizing and/or configuring the new component carrier (e.g., component carrier CC4) transmitted form the same network node (e.g., network node eNB2). In other words, user equipment 110-1 may always perform aided synchronization when adding a new component carrier that is transmitted from the same network node as the component carrier CC3 that is used to transmit the command to add (e.g., add, configure, and/or activate) new component carrier CC4, and user equipment may not even attempt to perform individual synchronization in such a situation.

When adding component carrier CC4 according to some other embodiments, user equipment 110-1 may first attempt to configure and/or synchronize new component carrier CC4 individually using synchronization signals of the new component carrier CC4. If user equipment 110-1 is unable to synchronize the new component carrier CC4 individually (e.g., because new component carrier CC4 does not include synchronization signals, because synchronization signals of component carrier CC4 are subject to interference, and/or because synchronization signals of component carrier CC4 are transmitted with no/insufficient power), then user equipment 110-1 may perform aided synchronization using synchronization signals of the component carrier CC3 (used to transmit the command to add new component carrier CC4) to configure and/or synchronize new component carrier CC4.

According to still other embodiments, a flag may be used to indicate whether to use individual or aided synchronization when configuring and/or synchronizing new component carrier CC4. The flag may be either an explicit parameter that is signaled, or an implicit parameter that is derived from another parameter that is signaled. Assuming that a parameter "X" is only transmitted with the command to add (e.g., add, configure, and/or activate) component carrier CC4 when aided synchronization (using the reference component carrier CC3) is to be performed, the implicit flag may be that when the parameter "X" is present, the reference component carrier CC3 synchronization signals are used to configure and/or synchronize new component carrier CC4 (referred to as aided synchronization), and when the parameter "X" is not present, synchronization signals of component carrier CC4 are used to configured and/or synchronize component carrier CC4 (referred to as individual synchronization). The parameter "X", for example, may be an indication of a cyclic prefix length of new component carrier CC4, and/or a downlink transmission bandwidth of new component carrier CC4.

Figure 17:
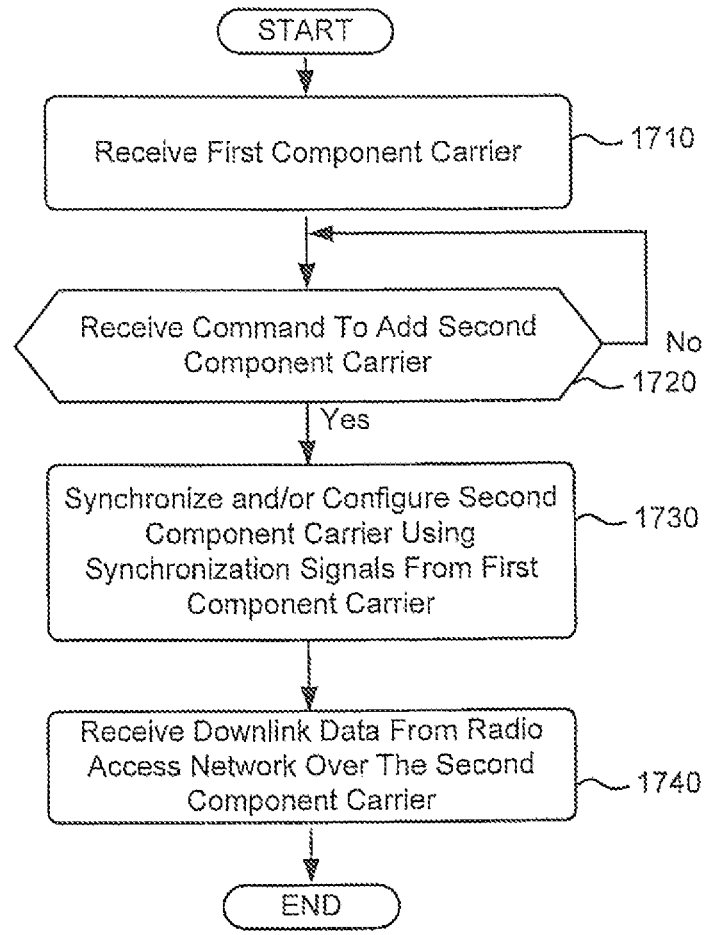
FIGS. 17, 18, and 19 are flow charts illustrating operations of wireless terminals synchronizing component carriers.

FIG. 17 is a flow chart illustrating operations of a wireless terminal (e.g., user equipment 110-1) providing signal synchronization at the wireless terminal communicating with a radio access network 100 according to some embodiments. A first component carrier may be transmitted from the radio access network 100 (e.g., network node eNB1 or eNB2) on a first frequency, and at block 1710, the first component carrier may be received at the wireless terminal (e.g., user equipment 110-1). The radio access network (e.g., network node eNB1 or eNB2) may transmit a command to add a second component carrier on a second frequency as a downlink for transmissions, and at block 1720, the wireless terminal may receive the command from the radio access network (e.g., from network node eNB1 or eNB2) to add the second carrier as a downlink for transmission from the radio access network to the wireless terminal. Responsive to receiving the command to add the second component carrier, the wireless terminal may synchronize and/or configure the second carrier using synchronization signals of the first carrier on the first frequency different than the second frequency at block 1730. Once the second component carrier has been synchronized and/or configured, the wireless terminal may receive downlink data from the radio access network over the second component carrier at block 1740.

For example, the first carrier may be a primary component carrier (PCC) for the wireless terminal, and/or the command to add the second component carrier may be transmitted by the radio access network and received at the wireless terminal over the first component carrier. Moreover, the first and second carriers may be transmitted from a same antenna location of the radio access network.

Figure 18:
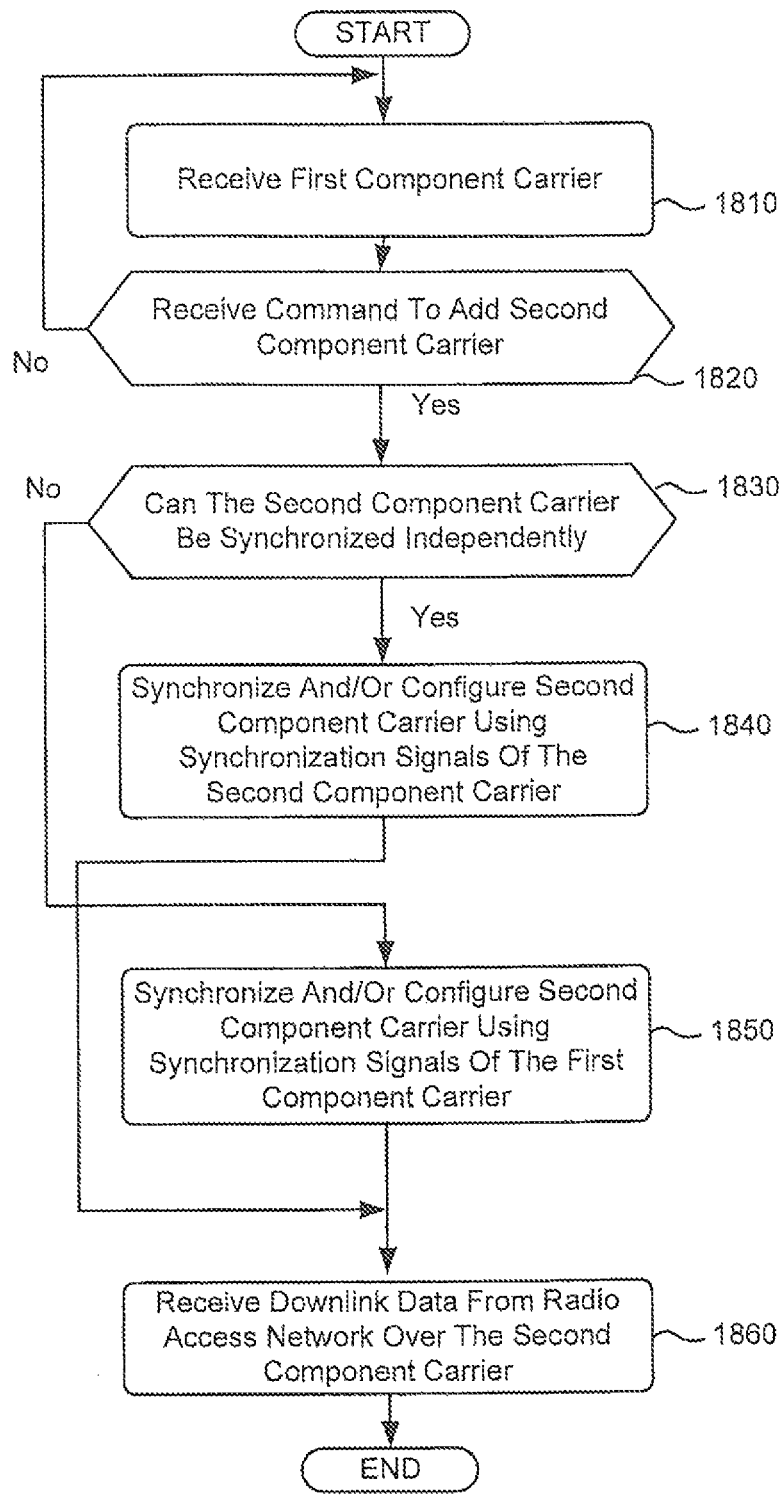

FIG. 18 is a flow chart illustrating operations of a wireless terminal (e.g., user equipment 110-1) providing signal synchronization at the wireless terminal communicating with a radio access network 100 according to some other embodiments. A first component carrier may be transmitted from the radio access network 100 (e.g., network node eNB1 or eNB2) on a first frequency, and at block 1810, the first component carrier may be received at the wireless terminal (e.g., user equipment 110-1). The radio access network (e.g., network node eNB1 or eNB2) may transmit a command to add a second component carrier on a second frequency as a downlink for transmissions, and at block 1820, the wireless terminal may receive the command from the radio access network (e.g., from network node eNB1 or eNB2) to add the second carrier as a downlink for transmission from the radio access network to the wireless terminal.

Responsive to receiving the command to add the second carrier, the wireless terminal may determine at block 1830 if the second carrier can be synchronized and/or configured using synchronization signals of the second carrier. Responsive to determining that the second carrier can be synchronized and/or configured using synchronization signals of the second carrier, the wireless terminal may synchronize and/or configure the second carrier using synchronization signals of the second carrier at block 1840. Responsive to determining that the second carrier cannot be synchronized and/or configured using synchronization signals of the second carrier, the wireless terminal may synchronize and/or configure the second carrier using synchronization signals of the first carrier on the first frequency different than the second frequency at block 1850. Once the second component carrier has been synchronized and/or configured at block 1840 or at block 1850, the wireless terminal may receive downlink data from the radio access network over the second component carrier at block 1860.

For example, the first carrier may be a primary component carrier (PCC) for the wireless terminal, and/or the command to add the second component carrier may be transmitted by the radio access network and received at the wireless terminal over the first component carrier. Moreover, the first and second carriers may be transmitted from a same antenna location of the radio access network.

Figure 19:
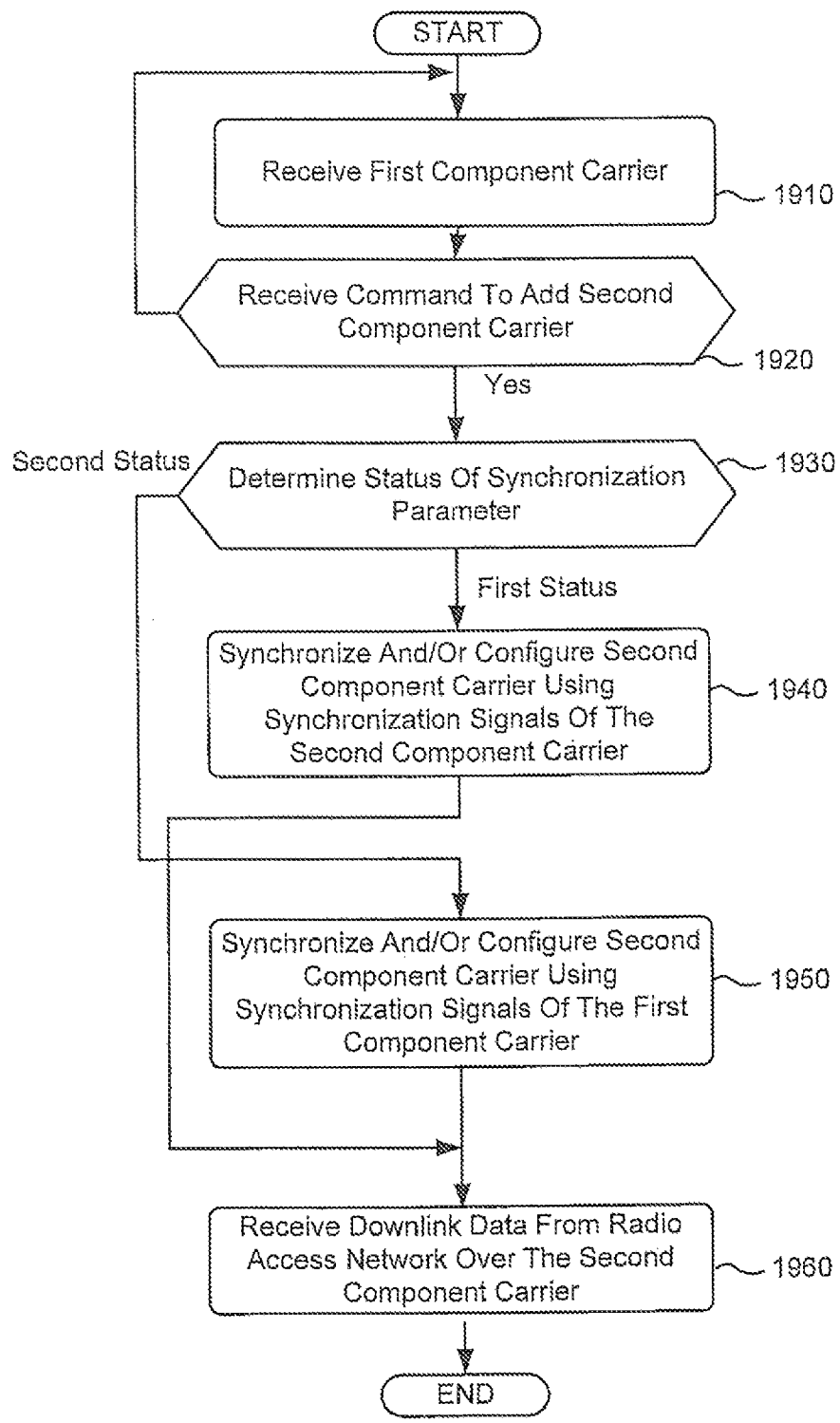

FIG. 19 is a flow chart illustrating operations of a wireless terminal (e.g., user equipment 110-1) providing signal synchronization at the wireless terminal communicating with a radio access network 100 according to some other embodiments. A first component carrier may be transmitted form the radio access network 100 (e.g., network node eNB1 or eNB2) on a first frequency, and at block 1910, the first component carrier may be received at the wireless terminal (e.g., user equipment 110-1). The radio access network (e.g., network node eNB1 or eNB2) may transmit a command to add a second component carrier on a second frequency as a downlink for transmissions, and at block 1920, the wireless terminal may receive the command from the radio access network (e.g., from network node eNB1 or eNB2) to add the second carrier as a downlink for transmission from the radio access network to the wireless terminal. More particular, the command transmitted by the radio access network may include a synchronization parameter, and the wireless terminal may receive the synchronization parameter with the command at block 1920.

At block 1930, the wireless terminal may determine a status of the synchronization parameter. Responsive to the synchronization parameter having a first status, the wireless terminal may synchronize and/or configure the second carrier using synchronization signals of the second carrier at block 1940. Responsive to the synchronization parameter having a second status (different than the first status), the wireless terminal may synchronize and/or configure the second carrier using synchronization signals of the carrier on the first frequency different than the second frequency at block 1950. Once the second component carrier has been synchronized and/or configured at block 1940 or at block 1950, the wireless terminal may receive downlink data from the radio access network over the second component carrier at block 1960.

The synchronization parameter, for example, may be a flag with the first status of the synchronization parameter being a first value of the flag and with the second status of the synchronization parameter being a second value of the flag different than the first value. More particularly, the flag may be a binary/digital bit having a value of 1 or zero. According to other embodiments, the first status of the synchronization parameter may be defined by an absence of the synchronization parameter in the command, and the second status of the synchronization parameter may be defined by a presence of the synchronization parameter in the command. The synchronization parameter, for example, may be an indication of a cyclic prefix length of the second carrier and/or a downlink transmission bandwidth of the second carrier.

Moreover, the first carrier may be a primary component carrier (PCC) for the wireless terminal, and/or the command to add the second component carrier may be transmitted by the radio access network and received at the wireless terminal over the first component carrier. In addition, the first and second carriers may be transmitted from a same antenna location of the radio access network.

In the above-description of various embodiments of the present invention, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Exemplary embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BlueRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks.

Accordingly, embodiments of the present invention may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various exemplary combinations and subcombinations of embodiments and of the manner and process of making and using them, and shall support claims to any such combination or subcombination.

In the specification, there have been disclosed embodiments of the invention and, although specific terms are employed, they are used in a generic and descriptive sense only and not for purposes of limitation. Many variations and modifications can be made to the embodiments without substantially departing from the principles of the present invention. All such variations and modifications are intended to be included herein within the scope of the present invention.

That which is claimed is:

1. A method providing signal synchronization at a wireless terminal communicating with a radio access network, the method comprising:
   receiving, from the radio access network, a command to add a first carrier on a first frequency as a link for transmissions from the radio access network to the wireless terminal, wherein the command comprises a parameter having a first status or a second status;
   responsive to and after receiving the command to add the first carrier, determining if the first carrier can be synchronized using synchronization signals of a second carrier on a second frequency different than the first frequency, wherein the command to add the first carrier is different than the synchronization signals of the second carrier, and wherein the synchronization signals include at least one of Primary Synchronization Channel signals, Secondary Synchronization Channel signals, and/or Cell Specific Reference signals;
   if it is determined based on the first status that the first carrier can be synchronized using synchronization signals of the second carrier, synchronizing the first carrier using synchronization signals of the second carrier on the second frequency different than the first frequency;
   if it is determined based on the second status that the first carrier cannot be synchronized using synchronization signals of the second carrier, synchronizing the first carrier using synchronization signals of the first carrier;
   wherein the first status is defined by one of an absence of the parameter in the command and a presence of the parameter in the command, and wherein the second status is defined by the other of the absence of the parameter in the command and the presence of the parameter in the command.

2. A method according to claim 1 wherein the second carrier on the second frequency comprises a primary component carrier, the method further comprising:
   before receiving the command to add the first carrier, receiving the primary component carrier.

3. A method according to claim 1 wherein receiving the command to add the first carrier comprises receiving the command to add the first carrier over the second carrier.

4. A method according to claim 1 further comprising:
   before synchronizing the first carrier using synchronization signals of the second carrier, receiving information from the radio access network relating the second carrier as a source of synchronization signals that can be used to synchronize the first carrier.

5. A method according to claim 1 wherein the parameter comprises a flag, wherein the first status of the parameter comprise a first value of the flag, and wherein the second status of the parameter comprises a second value of the flag different than the first value.

6. A method according to claim 1 wherein the first status of the parameter comprises an absence of the parameter in the command, and wherein the second status of the parameter comprises a presence of the parameter in the command.

7. A method according to claim 6 wherein the parameter comprises an indication of a cyclic prefix length of the first carrier and/or a transmission bandwidth of the first carrier.

8. A wireless terminal comprising:
   a processor configured to receive, from a radio access network, a command to add a first carrier on a first frequency as a link for communications from the radio access network to the wireless terminal, and to synchronize the first carrier using synchronization signals of a second carrier on a second frequency different than the first frequency responsive to and after receiving the command to add the first carrier, wherein the command to add the first carrier is different than the synchronization signals of the second carrier, wherein the synchronization signals of the second carrier on the second frequency include at least one of Primary Synchronization Channel signals, Secondary Synchronization Channel signals, and/or Cell Specific Reference signals, and wherein the command comprises a parameter comprising an indication of a cyclic prefix length of the second carrier and/or a transmission bandwidth of the second carrier;
   wherein the command to add the second carrier comprises a parameter having a first status or a second status;
   wherein if it is determined based on the second status that the second carrier can be synchronized using synchronization signals of the first carrier, synchronizing the second carrier using synchronization signals of the first carrier on the first frequency different than the second frequency; and
   wherein if it is determined based on the first status that the second carrier cannot be synchronized using synchronization signals of the first carrier, synchronizing the second carrier using synchronization signals of the second carrier; and
   wherein the first status is defined by one of an absence of the parameter in the command and a presence of the parameter in the command, and wherein the second status is defined by the other of the absence of the parameter in the command and the presence of the parameter in the command.

9. A method for a radio access network to add a carrier for transmission to a wireless terminal communicating with the radio access network, the method comprising:
   transmitting, to the wireless terminal, a first carrier on a first frequency, wherein the first carrier includes synchronization signals aligned with a second carrier on a second frequency different than the first frequency;
   transmitting, to the wireless terminal, information relating the first carrier as a source of the synchronization signals aligned with the second carrier that can be used at the wireless terminal to synchronize the second carrier;
   transmitting, to the wireless terminal, a command to add the second carrier for communications from the radio access network to the wireless terminal;
   after transmitting the command to add the second carrier, transmitting, to the wireless terminal, communications over the second carrier;
   wherein the command to add the second carrier is different than the synchronization signals of the first carrier, wherein the synchronization signals of the first carrier on the first frequency include at least one of Primary Synchronization Channel signals, Secondary Synchronization Channel signals, and/or Cell Specific Reference signals;
   wherein the command to add the second carrier comprises a parameter having a first status or a second status;
   wherein if it is determined based on the second status that the second carrier can be synchronized using synchronization signals of the first carrier, synchronizing the second carrier using synchronization signals of the first carrier on the first frequency different than the second frequency; and
   wherein if it is determined based on the first status that the second carrier cannot be synchronized using synchronization signals of the first carrier, synchronizing the second carrier using synchronization signals of the second carrier; and wherein the first status is defined by one of an absence of the parameter in the command and a presence of the parameter in the command, and wherein the second status is defined by the other of the absence of the parameter in the command and the presence of the parameter in the command.

10. A method according to claim 9 wherein transmitting the command to add the second carrier comprises transmitting the command over the first carrier.

11. A method according to claim 9 wherein the first carrier comprises a primary carrier.

12. A method according to claim 9 wherein the second carrier is transmitted without synchronization signals.

13. A method according to claim 9 wherein the command comprises a first command to add the second carrier, and wherein transmitting the first command comprises transmitting the first command including a parameter having a first status of the parameter to identify the first carrier as including the synchronization signals aligned with the second carrier to be used by the wireless terminal to synchronize and/or configure the second carrier, the method further comprising:

transmitting, to the wireless terminal, a second command to add a third carrier on a third frequency for communications from the radio access network to the wireless terminal, wherein the second command includes the parameter having a second status to identify the third carrier as including synchronization signals to be used by the wireless terminal to synchronize the third carrier, wherein the second and third frequencies are different; and after transmitting the second command to add the third carrier for communications to the wireless terminal, transmitting communications to the wireless terminal over the third carrier.

14. A method according to claim 13 wherein the parameter comprises a flag, wherein the first status of the parameter comprises a first value of the flag, and wherein the second status of the parameter comprises a second value of the flag different than the first value.

15. A method according to claim 13 wherein the first status of the parameter comprises a presence of the parameter in the first command, and wherein the second status of the parameter comprises an absence of the parameter in the second command.

16. A method according to claim 9 wherein transmitting the first carrier, transmitting the information relating the first carrier as a source, transmitting the command, and transmitting the communications are performed at a same node of the radio access network.

17. A node of a radio access network providing communications with a wireless terminal, the node comprising:

radio frequency circuitry configured to transmit, to the wireless terminal, a first carrier on a first frequency, wherein the first carrier includes synchronization signals aligned with a second carrier on a second frequency different than the first frequency, configured to transmit information to the wireless terminal relating the first carrier as a source of the synchronization signals aligned with the second carrier that can be used at the wireless terminal to synchronize and/or configure the second carrier, configured to transmit, to the wireless terminal, a command to add the second carrier for communications from the radio access network to the wireless terminal, and configured to transmit communications to the wireless terminal over the second carrier after transmitting the command to add the second carrier for communications, wherein the command to add the second carrier is different than the synchronization signals of the first carrier, wherein the synchronization signals of the first carrier on the first frequency include at least one of Primary Synchronization Channel signals, Secondary Synchronization Channel signals, and/or Cell Specific Reference signals, and wherein the command comprises a parameter comprising an indication of a cyclic prefix length of the second carrier and/or a transmission bandwidth of the second carrier;

wherein the command to add the second carrier comprises a parameter having a first status or a second status;

wherein if it is determined based on the second status that the second carrier can be synchronized using synchronization signals of the first carrier, synchronizing the second carrier using synchronization signals of the first carrier on the first frequency different than the second frequency; and wherein if it is determined based on the first status that the second carrier cannot be synchronized using synchronization signals of the first carrier, synchronizing the second carrier using synchronization signals of the second carrier; and wherein the first status is defined by one of an absence of the parameter in the command and a presence of the parameter in the command, and wherein the second status is defined by the other of the absence of the parameter in the command and the presence of the parameter in the command.

18. A method according to claim 1 wherein synchronizing the first carrier comprises time/frequency synchronizing the first carrier using the synchronization signals of the second carrier.

19. A wireless terminal according to claim 8 wherein the processor is configured to synchronize the first carrier by time/frequency synchronizing the first carrier using the synchronization signals of the second carrier.

20. A method according to claim 9 wherein the information relates the first carrier as a source of the synchronization signals aligned with the second carrier that can be used at the wireless terminal to time/frequency synchronize the second carrier.

21. A node according to claim 17 wherein the information relates the first carrier as a source of the synchronization signals aligned with the second carrier that can be used at the wireless terminal to time/frequency synchronize the second carrier.

* * * * *

UNITED STATES PATENT AND TRADEMARK OFFICE
CERTIFICATE OF CORRECTION

PATENT NO. : 9,144,044 B2  
APPLICATION NO. : 13/043027  
DATED : September 22, 2015  
INVENTOR(S) : Baldemair et al.

Page 1 of 1

It is certified that error appears in the above-identified patent and that said Letters Patent is hereby corrected as shown below:

In the Specification

In Column 24, Line 13, delete "110-1hg" and insert -- 110-1 --, therefor.

In Column 24, Line 14, delete "may server" and insert -- may serve --, therefor.

In Column 25, Line 14, delete "transmitted form" and insert -- transmitted from --, therefor.

In Column 26, Line 27, delete "transmitted form" and insert -- transmitted from --, therefor.

In Column 28, Line 15, delete "transmitted form" and insert -- transmitted from --, therefor.

Signed and Sealed this  
Fifteenth Day of March, 2016

Michelle K. Lee  
*Director of the United States Patent and Trademark Office*